(12) United States Patent
Murata et al.

(10) Patent No.: US 12,467,809 B2
(45) Date of Patent: Nov. 11, 2025

(54) DETECTOR AND DETECTING SYSTEM

(71) Applicant: Alps Alpine Co., Ltd., Tokyo (JP)

(72) Inventors: Shinji Murata, Miyagi (JP); Kimihiro Yokoyama, Tokyo (JP)

(73) Assignee: Alps Alpine Co., Ltd. (JP)

( * ) Notice: Subject to any disclaimer, the term of this patent is extended or adjusted under 35 U.S.C. 154(b) by 499 days.

(21) Appl. No.: 17/895,675

(22) Filed: Aug. 25, 2022

(65) Prior Publication Data

US 2022/0404222 A1 Dec. 22, 2022

Related U.S. Application Data

(63) Continuation of application No. PCT/JP2021/010929, filed on Mar. 17, 2021.

(30) Foreign Application Priority Data

Mar. 19, 2020 (JP) .................................. 2020-049851
Mar. 27, 2020 (JP) .................................. 2020-058466

(51) Int. Cl.
*G01L 5/24* (2006.01)
*G01L 1/22* (2006.01)
*G01L 5/1627* (2020.01)

(52) U.S. Cl.
CPC .............. *G01L 5/24* (2013.01); *G01L 1/2287* (2013.01); *G01L 5/1627* (2020.01)

(58) Field of Classification Search
CPC .............................. G01L 5/243; G01L 1/2231
See application file for complete search history.

(56) References Cited

U.S. PATENT DOCUMENTS

| 5,877,088 A | * | 3/1999 | Samitsu ................ B24B 37/013 |
| | | | 438/692 |
| 6,250,863 B1 | | 6/2001 | Kamentser et al. |
| 10,700,573 B2 | | 6/2020 | Fukushima |
| 2010/0054891 A1 | * | 3/2010 | Nishida .................... B25B 23/14 |
| | | | 73/761 |
| 2011/0181393 A1 | | 7/2011 | Tillotson et al. |

(Continued)

FOREIGN PATENT DOCUMENTS

| JP | S47-017392 B1 | 5/1972 |
| JP | S58-165634 A | 9/1983 |
| JP | H02-193031 A | 7/1990 |

(Continued)

OTHER PUBLICATIONS

International Search Report (English translation) for corresponding International Application No. PCT/JP2021/010929, mailed Apr. 20, 2021 (7 Pages).

*Primary Examiner* — Laura Martin
*Assistant Examiner* — Alex T Devito
(74) *Attorney, Agent, or Firm* — Harness, Dickey & Pierce, P.L.C.

(57) ABSTRACT

A detector is a detector that detects fastening axial force applied by a fastening unit in an axial direction. The detector includes a strain element that has a through hole through which a bolt portion that the fastening unit has is inserted, and a strain sensing sensor that senses strain of the strain element. The strain element has a block-like form and has a planar portion following the axial direction on a side face thereof. The strain sensing sensor is provided on the planar portion.

7 Claims, 32 Drawing Sheets

(56) References Cited

U.S. PATENT DOCUMENTS

2019/0195263 A1    6/2019   Anthoine-Milhomme

FOREIGN PATENT DOCUMENTS

| JP | 2010-053927 A | 3/2010 |
| JP | 5671064 B2 | 2/2015 |
| JP | 2019-080389 A | 5/2019 |
| JP | 2019-132841 A | 8/2019 |

\* cited by examiner

FIG. 15
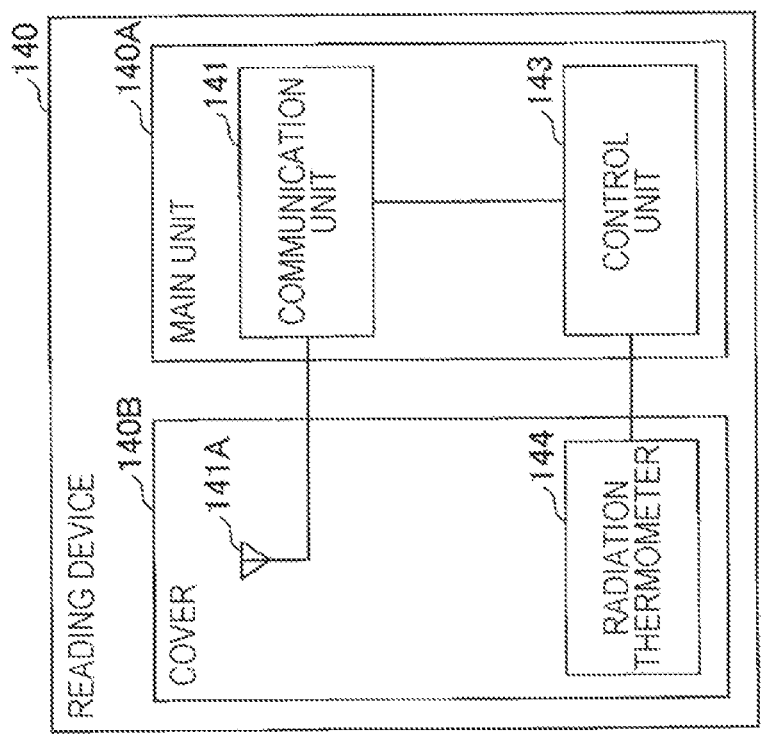
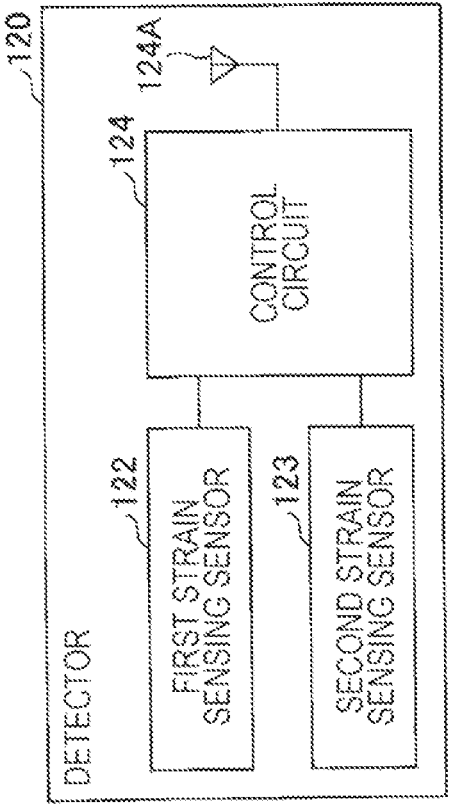

FIG. 22

| | SYMBOL | REFERENCE VALUE (10 mm DIAMETER) | REFERENCE VALUE (24 mm DIAMETER) | UNIT |
|---|---|---|---|---|
| INPUT LOAD (AXIAL FORCE) | F | 9550 | 58000 | N |
| STRAIN | $\varepsilon$ | 120 | 190 | $\mu\varepsilon$ |
| STRAIN SENSOR RESISTANCE VALUE | R | 350 | 350 | $\Omega$ |
| GAUGE FACTOR | K | 2.11 | 2.11 | - |
| AMOUNT OF CHANGE IN RESISTANCE VALUE OF STRAIN SENSOR | $\Delta R$ | 0.08862 | 0.14032 | $\Omega$ |

FIG. 26

|  | A | B | C |
|---|---|---|---|
| THICKNESS | FAIR | EXCELLENT | EXCELLENT |
| TEMPERATURE VARIANCE | GOOD | GOOD | FAIR |
| AXIAL SYMMETRY | GOOD | FAIR | GOOD |
| BONDING DEFECT | GOOD | GOOD | EXCELLENT |
| WIRING CONNECTION | EXCELLENT | EXCELLENT | GOOD |

DETECTOR AND DETECTING SYSTEM

CLAIM OF PRIORITY

This application is a Continuation of International Application No. PCT/JP2021/010929 filed on Mar. 17, 2021, which claims benefit of Japanese Patent Application No. 2020-049851 filed on Mar. 19, 2020 and No. 2020-058466 filed on Mar. 27, 2020. The entire contents of each application noted above are hereby incorporated by reference.

BACKGROUND OF THE INVENTION

1. Field of the Invention

The present invention relates to a detector and a detecting system.

2. Description of the Related Art

There conventionally has been proposed technology for enabling detection of loosening in fastening members (e.g., bolts, nuts, etc.) by detecting strain in a member (strain element) fixed by the fastening members to an installation face, using a strain sensor provided to the members.

For example, Japanese Unexamined Utility Model Registration Application Publication No. 58-165634 discloses technology for applying a strain gauge to an outer circumferential face of a cylindrical body having a flange-like form. Also, Japanese Unexamined Patent Application Publication No. 2019-080389 discloses technology for detecting occurrence of loosening of a bolt by providing a strain gauge in the vicinity of a bolt in a fixation portion of an electric motor, for example.

However, with the technology according to Japanese Unexamined Utility Model Registration Application Publication No. 58-165634, applying the strain gauge is difficult since the outer circumferential face of the cylindrical member to which the strain gauge is applied is a curved face, and disposing defects of the strain gauge may occur. Accordingly, sensing precision of strain in the cylindrical member by the strain gauge may deteriorate in the technology according to Japanese Unexamined Utility Model Registration Application Publication No. 58-165634, due to disposing defects of the strain gauge.

Also, in the technology according to Japanese Unexamined Patent Application Publication No. 2019-080389, the strain gauge is provided horizontally on the same face as a head of the bolt, on an upper face of the fixation portion, and accordingly slight strain (i.e., slight loosening of the bolt) of the fixation portion cannot be detected with a high level of precision by the strain gauge.

SUMMARY OF THE INVENTION

The present invention provides an embodiment to improve sensing precision of strain in a strain element by a strain gauge disposed on the strain element.

A detector according to an embodiment is a detector that detects fastening axial force applied by a fastening unit in an axial direction. The detector includes a strain element that has a through hole through which a bolt portion that the fastening unit has is inserted, and a strain sensing sensor that senses strain of the strain element. The strain element has a block-like form and has a planar portion following the axial direction on a side face thereof. The strain sensing sensor is provided on the planar portion.

Also, another detector according to an embodiment is a detector that detects fastening axial force applied by a fastening unit in an axial direction. The detector includes a strain element that has a through hole through which a bolt portion that the fastening unit has is inserted, and a strain sensing sensor that senses strain of the strain element. The strain element has a block-like base portion having a through hole, and a protruding portion that has a thin-plate form and is provided protruding from an outer side of the base portion direction intersecting the axial direction. The strain sensing sensor is provided on the protruding portion.

According to an embodiment, sensing precision of strain in a strain element by a strain gauge disposed on the strain element can be improved.

BRIEF DESCRIPTION OF THE DRAWINGS

FIG. 15 is a diagram illustrating a system configuration of a detecting system according to a third embodiment;

FIG. 22 is a diagram showing an example of input/output properties of the detector according to the third embodiment;

FIG. 26 is a diagram showing evaluation results of the detector according to the third embodiment;

DESCRIPTION OF THE PREFERRED EMBODIMENTS

Figure 1:
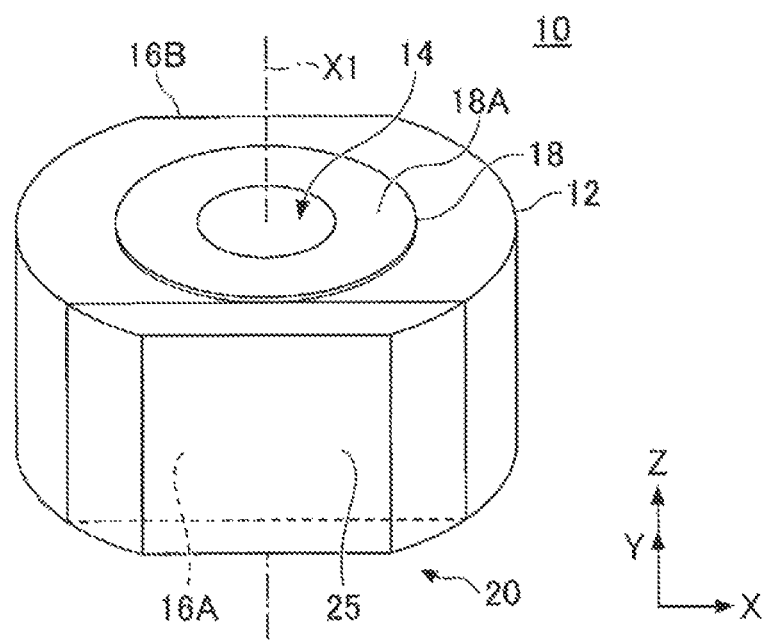
FIG. 1 is a perspective view illustrating an outer appearance of an upper face side of a detector according to a first embodiment.

An embodiment will be described below. Note that in the following description, for the sake of convenience, a Z-axial direction in the drawings (axial direction of center axis X described later) is an up-down direction, an X-axial direction in the drawings (lateral direction of planar portion 16A described later) is a right-left direction, and a Y-axial direction in the drawings (perpendicular direction of planar portion 16A described later) is a front-rear direction. Also, the X-axial direction in the drawings and the Y-axial direction in the drawings are horizontal directions.

First Embodiment

Overview of Detector 10

FIG. 1 is a perspective view illustrating an outer appearance of an upper face side of a detector 10 according to a first embodiment. The detector 10 illustrated in FIG. 1 is a device having a generally cylindrical form. By disposing the detector 10 between a fastening member (bolt or nut) and a fastened member at the time of the fastened member being fixed by screwing to a predetermined attachment face (e.g., a wall face), the detector 10 can detect fastening axial force applied in an axial direction of a center axis X1 due to fastening of the fastening member.

As illustrated in FIG. 1, the detector 10 includes a strain element 12 and a strain sensing module 20. The strain element 12 is a block-like member that has a generally cylindrical form. A metal material such as stainless steel or the like, for example, is suitably used to form the strain element 12. A through hole 14 that passes through the strain element 12 in the up-down direction (Z-axial direction) following the center axis X1 is formed in the center of the strain element 12. The through hole 14 is a portion through which a bolt portion belonging to a fastening unit 42 (see FIG. 7) passes.

Note that in a case in which the fastening member is a nut, the "bolt portion" is a bolt shaft attached to the attaching face. That is to say, in a case in which the fastening member is a nut, the fastening unit 42 is made up of the nut and a bolt shaft fixed to the attaching face.

On the other hand, in a case in which the fastening member is a bolt, the "bolt portion" is the bolt shaft of this bolt. That is to say, in a case in which the fastening member is a bolt, the fastening unit 42 is made up of the bolt and a nut fixed to the attaching face.

Also, as illustrated in FIG. 1, a seat portion 18 that is annular in form, may be formed on an upper face of the strain element 12, centered on the center axis X1 and surrounding the through hole 14. The seat portion 18 is a portion of which the height position thereof is slightly made higher than portions of the upper face of the strain element 12 surrounding the seat portion 18. An upper face 18A of the seat portion 18 may function as a planar receiving portion for receiving a fastening member (bolt or nut).

Also, as illustrated in FIG. 1, a pair of planar portions 16A and 16B are formed on a side face of the strain element 12, in the front-rear direction (Y-axial direction) across the through hole 14. The pair of planar portions 16A and 16B are parallel to each other, and are both parallel to an X-Z plane. The planar portion 16A is formed at a position closer to the center axis X1 than the planar portion 16B. Accordingly, the planar portion 16A has a wider area than that of the planar portion 16B. The pair of planar portions 16A and 16B are formed by cutting away part of an outer circumferential face of the strain element 12 having a cylindrical form before the machining, parallel to the X-Z plane, for example.

The strain sensing module 20 may be provided to the planar portion 16A on the side face of the strain element 12. The strain sensing module 20 can detect strain of the strain element 12, and externally output strain detection signals representing the magnitude of the detected strain as voltage values by wireless communication. As illustrated in FIG. 1, the strain sensing module 20 may include sealing resin 25 that covers the entirety of the strain sensing module 20. The sealing resin 25 covers other component parts of the strain sensing module 20, and the entirety of the planar portion 16A of the strain element 12, thereby protecting the other component parts and the planar portion 16A from rainwater, soiling, and so forth. Also, the sealing resin 25 is formed in a form following an outer form of the strain element 12 so as not to look unnatural. However, this is not limiting, and the outer form of the sealing resin 25 may be any form. For example, the outer form of the sealing resin 25 may be a form that is formed to appear natural by potting.

Configuration of Strain Sensing Module 20

Figure 2:
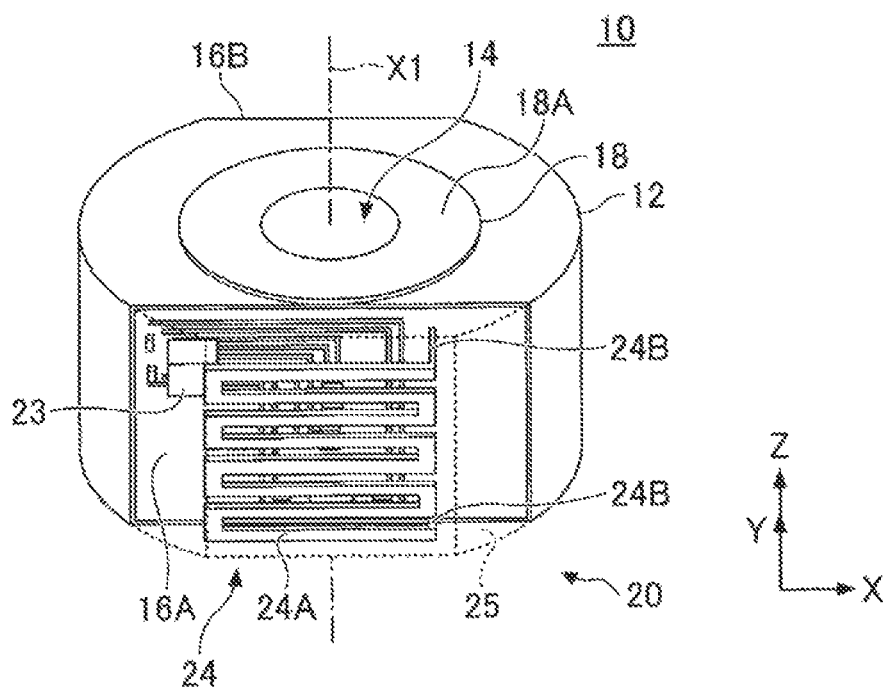
FIG. 2 is a perspective view illustrating an outer appearance of the upper face side of the detector according to the first embodiment.
Figure 3:
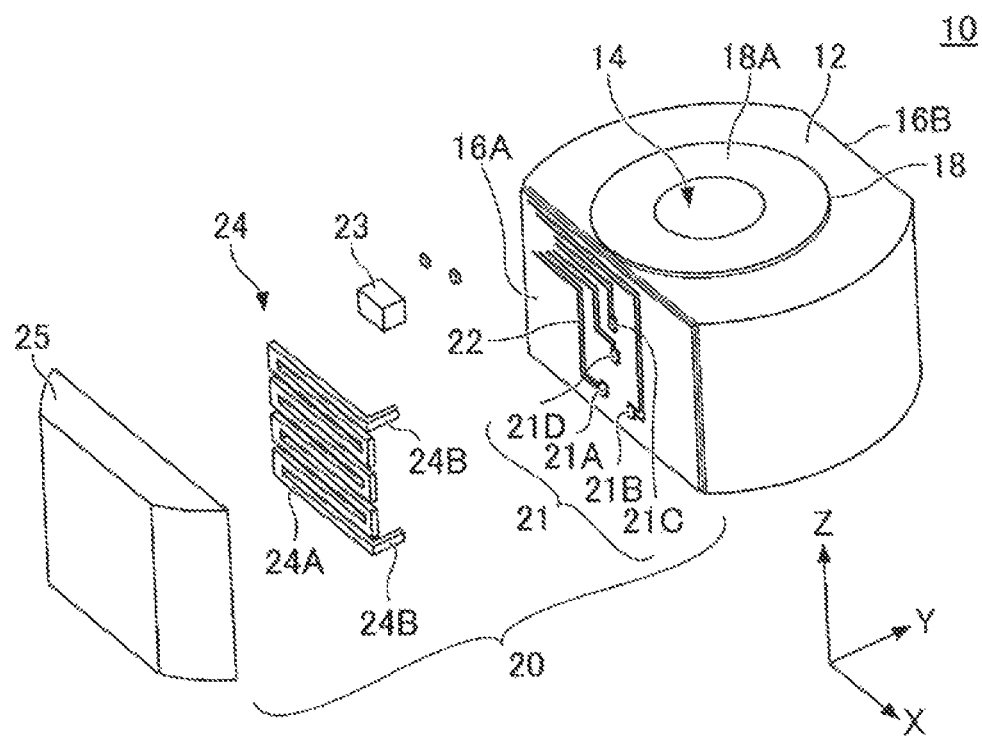
FIG. 3 is an exploded perspective view of the detector according to the first embodiment.

FIG. 2 is a perspective view illustrating the outer appearance of the upper face side of the detector 10 according to the first embodiment. FIG. 3 is an exploded perspective view of the detector 10 according to the first embodiment. Note however, that the sealing resin 25 of the strain sensing module 20 of FIG. 2 is illustrated as being transparent in FIG. 2.

As illustrated in FIGS. 2 and 3, the strain sensing module 20 may include a strain sensing sensor 21, a wiring pattern 22, an integrated circuit (IC) 23, a communication antenna 24, and the sealing resin 25.

The strain sensing sensor 21 has a first strain detecting element 21A, a second strain detecting element 21B, a third strain detecting element 21C, and a fourth strain detecting element 21D. The strain detecting elements 21A to 21D are each placed on the planar portion 16A. The strain detecting elements 21A to 21D each detect strain of the strain element 12. For example, the strain detecting elements 21A to 21D each use a strain resistor element of which the resistance value changes in accordance with the amount of strain. The strain detecting elements 21A to 21D make up a bridge circuit 30 (see FIG. 5). Note that the respective placement positions of the strain detecting elements 21A to 21D will be described later with reference to FIG. 4.

The wiring pattern 22 is a band-like member having electroconductivity that is formed on the planar portion 16A, connects each of the strain detecting elements 21A to 21D to the IC 23, and also connects the communication antenna 24 to the IC 23. The wiring pattern 22 is used for transmission of strain detection signals between each of the strain detecting elements 21A to 21D and the IC 23, and between the communication antenna 24 and the IC 23. The wiring pattern 22 is formed using, for example, a thin-film conductor (e.g., copper foil).

The IC 23 is an example of a "control circuit". The IC 23 is disposed at the planar portion 16A, and controls operations of the strain sensing module 20. For example, the IC 23 acquires strain detection signals representing the magnitude of strain of the strain element 12 from the bridge circuit 30 made up of the strain detecting elements 21A to 21D via the wiring pattern 22. The IC 23 then wirelessly transmits the strain detection signals acquired from the bridge circuit 30 to an external device, using the communication antenna 24.

The communication antenna 24 is used for transmitting strain detection signals. The communication antenna 24 includes a radiating plane 24A that is formed by a thin-film and band-like conductor being bent a plurality of times on the same plane. The radiating plane 24A is placed in parallel with the planar portion 16A, and also separated from the planar portion 16A. The communication antenna 24 is connected to the wiring pattern 22 formed on the planar portion 16A by two legs 24B that are provided on both of each end portions of the radiating plane 24A and that are perpendicular to the radiating plane 24A.

Placement Positions of Strain Detecting Elements 21A to 21D

Figure 4:
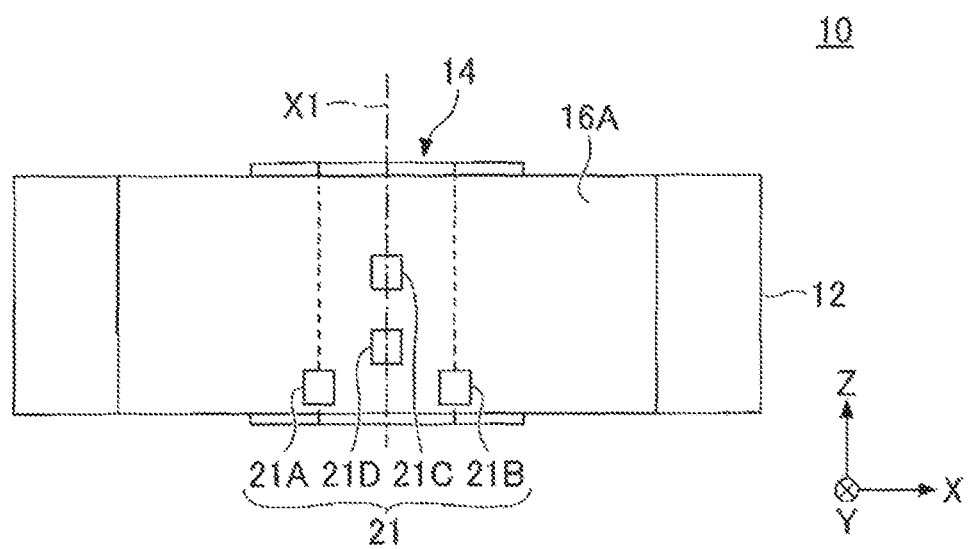
FIG. 4 is a diagram illustrating placement positions of strain detecting elements in the detector according to the first embodiment.

FIG. 4 is a diagram illustrating placement positions of the strain detecting elements 21A to 21D in the detector 10 according to the first embodiment. FIG. 4 represents a side face of the detector 10 in a case of viewing the planar portion 16A in plan view from the Y-axial negative side.

As illustrated in FIG. 4, the first strain detecting element 21A and the second strain detecting element 21B are arrayed in the right-left direction (X-axial direction) across the center axis X1, in the vicinity of a lower end portion (end portion on the Z-axial negative side) of the planar portion 16A. The first strain detecting element 21A is disposed to the left side of the center axis X1, the second strain detecting element 21B is disposed to the right side of the center axis X1, and the first strain detecting element 21A and the second strain detecting element 21B are disposed at equidistant positions from the center axis X1. In particular, the first strain detecting element 21A is disposed at a position overlapping a left end position of an inner circumferential face of the through hole 14 and the second strain detecting element 21B is disposed at a position overlapping a right end position of the inner circumferential face of the through hole 14.

These disposing positions are positions at which greater positive strain (strain in a compressing direction) occurs at each of the first strain detecting element 21A and the second strain detecting element 21B when fastening axial force is applied to the strain element 12 in the axial direction of the center axis X1, and have been found through simulation performed by the inventors of the present invention.

Also, as illustrated in FIG. 4, the third strain detecting element 21C and the fourth strain detecting element 21D are provided arrayed at the middle portion in the up-down direction (Z-axial direction) on the planar portion 16A, at positions overlapping the center axis X1 in the up-down direction (Z-axial direction). The third strain detecting element 21C is placed on an upper side, and the fourth strain detecting element 21D is placed on a lower side.

These disposing positions are positions at which greater negative strain (strain in a tensile direction) occurs at each of the third strain detecting element 21C and the fourth strain detecting element 21D when fastening axial force is applied to the strain element 12 in the axial direction of the center axis X1, and have been found through simulation performed by the inventors of the present invention.

Note that the strain detecting elements 21A to 21D can be disposed on the planar portion 16A by various disposing methods.

For example, the strain detecting elements 21A to 21D may be directly bonded to the planar portion 16A by an adhesive agent or the like.

Alternatively, for example, the strain detecting elements 21A to 21D may be formed on the planar portion 16A by printing composite resistors of a cermet or of which the binder is a synthetic resin. In this case as well, the strain detecting elements 21A to 21D can be disposed at predetermined disposing positions on the planar portion 16A easily and in a sure manner. Particularly, in this case, a plurality of the strain elements 12 can be arrayed, and in this state the plurality of strain elements 12 can be subjected to batch printing, drying, and hardening of the strain detecting elements 21A to 21D. Accordingly, the strain detecting elements 21A to 21D can be disposed on the plurality of strain elements 12 easily and in a sure manner.

Also, for example, the strain detecting elements 21A to 21D may be mounted on a rigid board or a flexible board, and in this state be bonded to the planar portion 16A along with the rigid board or the flexible board. In this case as well, the installation face is a flat face, and accordingly the strain detecting elements 21A to 21D can be disposed at predetermined disposing positions on the planar portion 16A easily and in a sure manner.

Configuration of Bridge Circuit 30

Figure 5:
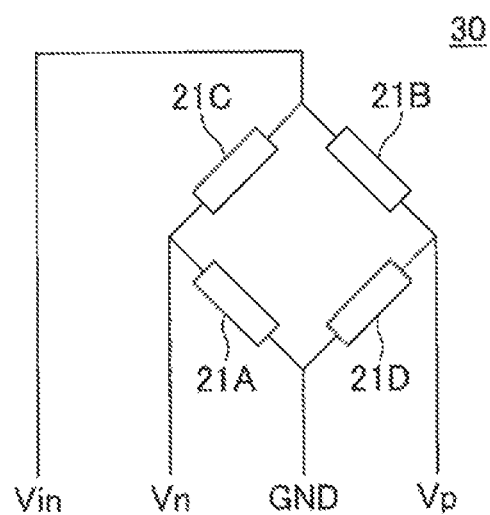
FIG. 5 is a circuit diagram of a bridge circuit included in the detector according to the first embodiment.

FIG. 5 is a circuit diagram of the bridge circuit 30 included in the detector 10 according to the first embodiment. As illustrated in FIG. 5, the bridge circuit 30 is configured including the strain detecting elements 21A to 21D.

In the bridge circuit 30 illustrated in FIG. 5, the more the fastening axial force increases on the strain element 12 in the axial direction on the center axis X1, the greater the resistance values of the strain detecting elements 21C and 21D become. On the other hand, the more the fastening axial force increases on the strain element 12 in the axial direction on the center axis X1, the smaller the resistance values of the strain detecting elements 21A and 21B become.

Accordingly, the more the fastening axial force increases on the strain element 12 in the axial direction on the center axis X1, the greater a voltage value Vp at a contact point of the strain detecting element 21B and the strain detecting element 21D becomes in the bridge circuit 30. Also, the more the fastening axial force increases on the strain element 12 in the axial direction on the center axis X1, the smaller a voltage value Vn at a contact point of the strain detecting element 21A and the strain detecting element 21C becomes.

The bridge circuit 30 amplifies and outputs voltage difference between the voltage value Vp and the voltage value Vn by a differential amplifier (omitted from illustration). Accordingly, the bridge circuit 30 can output strain detection signals in which the voltage value becomes great as the fastening axial force increases on the strain element 12 in the axial direction on the center axis X1.

Note that a tightening torque of the fastening member, and the fastening axial force on the strain element 12 in the axial direction on the center axis X1, are in a proportional relation with each other. That is to say, as the tightening torque of the fastening member increases, the fastening axial force on the strain element 12 in the axial direction on the center axis X1 increases. Accordingly, the bridge circuit 30 can output strain detection signals of which the voltage value increases as the tightening torque of the fastening member increases.

Example of Dimensions of Portions of the Detector 10

Figure 6:
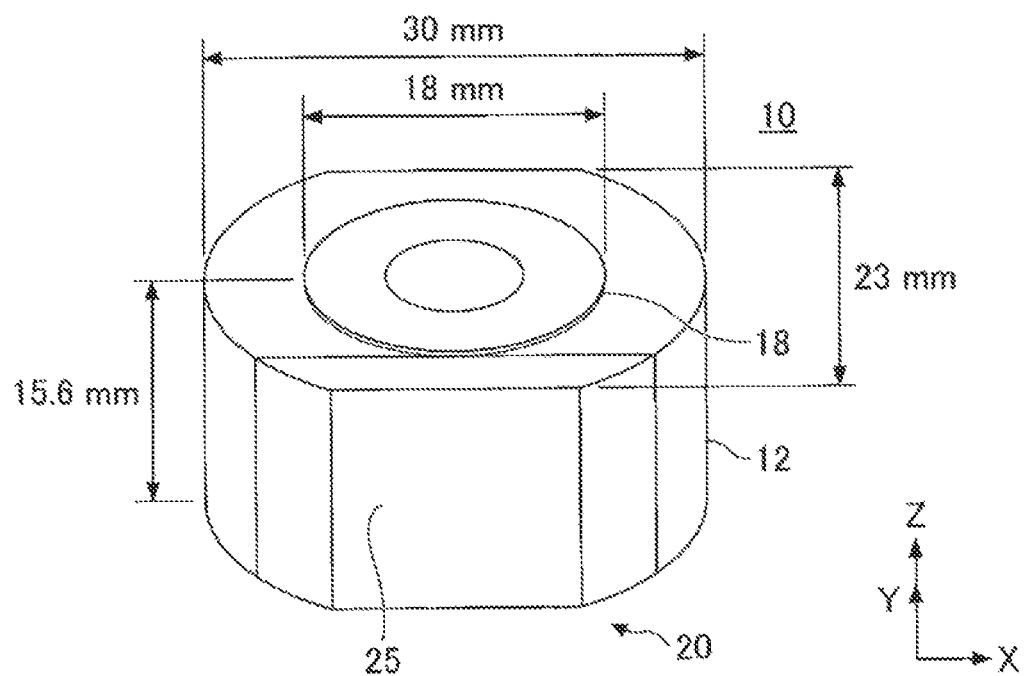
FIG. 6 is a diagram illustrating an example of dimensions of portions of the detector according to the first embodiment.

FIG. 6 is a diagram illustrating an example of dimensions of portions of the detector 10 according to the first embodiment. FIG. 6 illustrates an example of dimensions of the portions of the detector 10 in a case in which the detector 10 is for being attached to a bolt shaft that is 8 mm in diameter. In the example illustrated in FIG. 6, a lateral width (width in the X-axial direction) of the detector 10 is 30 mm. Also, the diameter of the seat portion 18 formed on the upper face of the strain element 12 is 18 mm. Also, the front-rear width (width in the Y-axis direction) of the detector 10 is 23 mm. Also, the up-down width (width in Z-axial direction) of the detector 10 is 15.6 mm.

Usage Example of Detector 10

Figure 7:
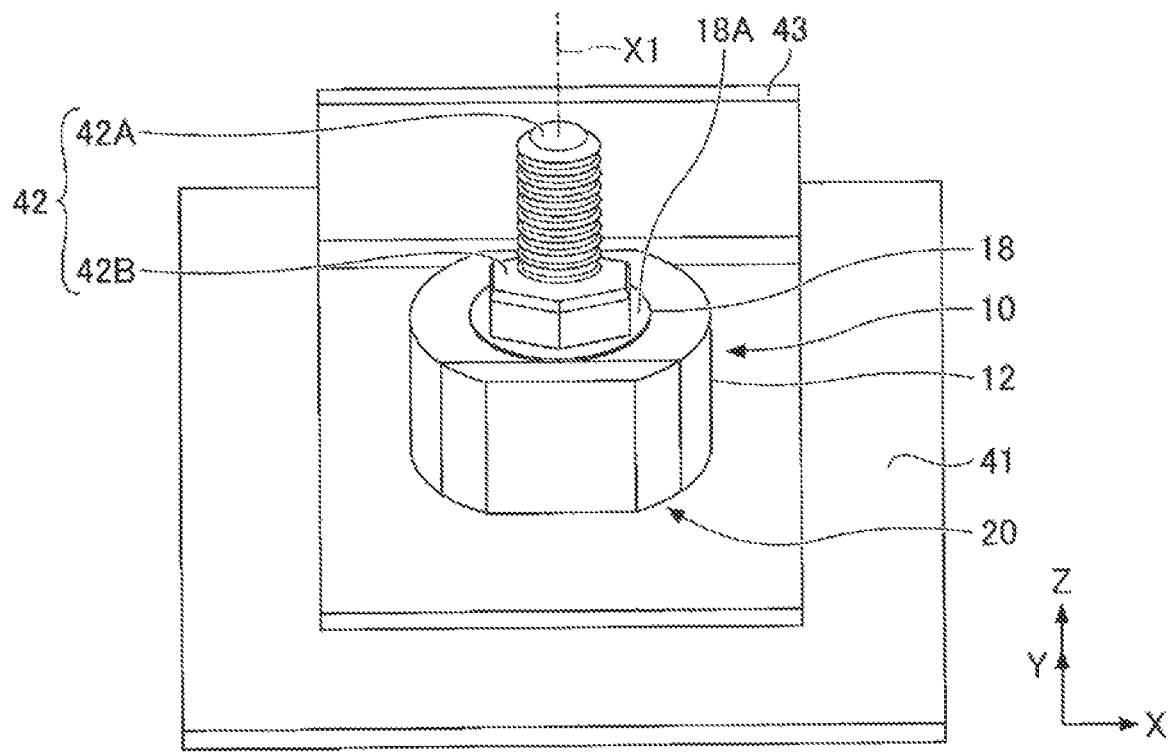
FIG. 7 is a diagram illustrating a usage example of the detector according to the first embodiment.

FIG. 7 is a diagram illustrating a usage example of the detector 10 according to the first embodiment. FIG. 7 represents an example in which a fastened member 43 that is plate-like in form is fixed by screwing to an attachment face 41, by a nut 42B.

In the example illustrated in FIG. 7, the detector 10 is provided between the nut 42B and the fastened member 43. A bolt shaft 42A, which extends upward from the attachment face 41, passes through the fastened member 43 and the strain element 12 of the detector 10. A basal end portion (end portion on the Z-axial negative side) of the bolt shaft 42A is fixed to the attachment face 41. The nut 42B is screwed down on the bolt shaft 42A from a distal end portion (end portion on the Z-axial positive side) side of the bolt shaft 42A. The nut 42B makes up the fastening unit 42 along with the bolt shaft 42A.

In the example illustrated in FIG. 7, when the nut 42B is screwed down, the fastened member 43 and the detector 10 are fixed to the attachment face 41. At this time, the strain element 12 of the detector 10 receives the nut 42B at the upper face 18A of the seat portion 18 formed on the upper face thereof. Thus, the fastening axial force in the axial direction (Z-axial direction) of the bolt shaft 42A is applied to the strain element 12. Now, the diameter of the seat portion 18 is larger than a maximum diameter (length of diagonal line) of the nut. Accordingly, the strain element 12 can receive the fastening axial force applied by the nut 42B in a surer manner, by the upper face 18A of the seat portion 18.

As a result, strain that corresponds to the tightening torque of the nut 42B occurs in the strain element 12. The strain occurring in the strain element 12 is detected by each of the strain detecting elements 21A to 21D (see FIGS. 3 to 5) included in the strain sensing module 20 of the detector 10. The bridge circuit 30 (see FIG. 5) included in the strain sensing module 20 then outputs strain detection signals corresponding to the tightening torque of the nut 42B to the IC 23 included in the strain sensing module 20, on the basis of the strain detected by each of the strain detecting elements 21A to 21D (i.e., change in resistance values of each of the strain detecting elements 21A to 21D). The IC 23 outputs the strain detection signals acquired from the bridge circuit 30 to an external device via wireless communication. For example, the external device can judge the tightening state of the nut 42B on the basis of voltage values indicated by the strain detection signals acquired from the detector 10.

Note that various types of output methods can be employed as the output method of strain detection signals by the strain sensing module 20. For example, when a tag reader is held up to the strain sensing module 20, the strain sensing module 20 may generate electric power by an electromotive coil, and use this electric power to perform wireless transmission of the strain detection signals to the tag reader. In this case, the strain sensing module 20 may have a configuration that does not include a battery or memory. However, this is not limiting, and the strain sensing module 20 may have a configuration that includes at least one of a battery and memory.

As described earlier, the detector 10 according to the first embodiment is a detector 10 that detects fastening axial force applied in the center axis X1 direction by the fastening unit 42, and includes the strain element 12 having the through hole 14 through which the bolt portion having the fastening unit 42 is passed, and the strain sensing sensor 21 that senses strain of the strain element 12. The strain element 12 is formed block-like in form, and has the planar portion 16A on the side face following the center axis X1 direction, and the strain sensing sensor 21 is provided on the planar portion 16A.

Accordingly, in the detector 10 according to the first embodiment, the strain sensing sensor 21 can be disposed on the planar portion 16A of the side face of the strain element 12, and accordingly the strain sensing sensor 21 can be disposed at the predetermined disposing position on the planar portion 16A easily and in a sure manner. Thus, according to the detector 10 of the first embodiment, the precision of the strain element 12 sensing strain by the strain sensing sensor 21 disposed in the strain element 12 can be improved.

Also, in the detector 10 according to the first embodiment, the strain sensing sensor 21 has the first strain detecting element 21A and the second strain detecting element 21B that are placed on the planar portion 16A so as to be arrayed in the horizontal direction (first direction) that is orthogonal to the center axis X1 direction.

Thus, the detector 10 according to the first embodiment can sense strain at two positions in the horizontal direction (first direction) on the planar portion 16A of the strain element 12, and accordingly strain in the horizontal direction of the strain element 12 can be detected with a high level of precision. Therefore, according to the detector 10 of the first embodiment, the precision of the strain element 12 sensing strain by the strain sensing sensor 21 disposed in the strain element 12, can be improved further.

Also, in the detector 10 according to the first embodiment, the first strain detecting element 21A and the second strain detecting element 21B are placed toward a bottom face side of the strain element 12, and also are each placed arrayed as to the center axis X1 with the center axis X1 of the through hole 14 interposed therebetween.

Accordingly, the detector 10 according to the first embodiment can sense strain at two positions on the planar portion 16A of the strain element 12 at which the amount of strain in the horizontal direction is great, and thus strain in the horizontal direction of the strain element 12 can be detected with an even higher level of precision. Therefore, according to the detector 10 of the first embodiment, the precision of the strain element 12 sensing strain by the strain sensing sensor 21 disposed in the strain element 12 can be improved further.

Also, in the detector 10 according to the first embodiment, the strain sensing sensor 21 further has the third strain detecting element 21C and the fourth strain detecting element 21D placed arrayed on the planar portion 16A in the up-down direction (second direction) following the center axis X1 direction.

Accordingly, the detector 10 according to the first embodiment can sense strain at two positions on the planar portion 16A of the strain element 12 in the center axis X1 direction, and thus can detect strain in the center axis X1 direction of the strain element 12 with a high level of precision. Therefore, according to the detector 10 of the first embodiment, the precision of the strain element 12 sensing strain by the strain sensing sensor 21 disposed in the strain element 12 can be improved further.

Also, in the detector 10 according to the first embodiment, in a case of viewing the planar portion 16A in plan view, the third strain detecting element 21C and the fourth strain detecting element 21D are placed at positions overlapping the center axis X1 of the through hole 14.

Accordingly, the detector 10 according to the first embodiment can sense strain at two positions on the planar portion 16A of the strain element 12 at which the amount of strain in the center axis X1 direction is great, and thus strain in the center axis X1 direction of the strain element 12 can be detected with an even higher level of precision. Therefore, according to the detector 10 of the first embodiment, the precision of the strain element 12 sensing strain by the strain sensing sensor 21 disposed in the strain element 12 can be improved further.

Also, in the detector 10 according to the first embodiment, the strain sensing sensor 21 includes the bridge circuit 30 made up including the first strain detecting element 21A, the second strain detecting element 21B, the third strain detecting element 21C, and the fourth strain detecting element 21D.

Accordingly, the detector 10 according to the first embodiment can output voltage values based on resistance values of each of the four strain detecting elements 21A to 21D as voltage values representing the strain of the strain element 12 by the bridge circuit 30. In particular, the detector 10 according to the first embodiment has two each of strain detecting elements placed in each of two directions orthogonal to each other (first direction and second direction) on the strain element 12, and accordingly difference therebetween can be detected better. Therefore, according to the detector 10 of the first embodiment, the precision of the strain element 12 sensing strain by the strain sensing sensor 21 disposed in the strain element 12 can be improved further.

Also, in the detector 10 according to the first embodiment, the strain element 12 may have a planar receiving portion on the upper face thereof that surrounds the through hole 14 and that receives the fastening member that the fastening unit 42 has.

Accordingly, the detector 10 according to the first embodiment can receive fastening axial force applied from the fastening member in a surer manner by the receiving portion. That is to say, the fastening state of the fastening member can be converted into strain of the strain element 12 in a surer manner. Therefore, according to the detector 10 of the first embodiment, the precision of the strain element 12 sensing strain by the strain sensing sensor 21 disposed in the strain element 12 can be improved further.

Also, the detector 10 according to the first embodiment may further include the IC 23 and the communication antenna 24.

Accordingly, the detector 10 according to the first embodiment can externally output highly-precise sensing data representing strain of the strain element 12 that is sensed by the strain sensing sensor 21, by wireless communication. Thus, according to the detector 10 of the first embodiment, external precision of the strain element 12 sensing strain by the strain sensing sensor 21 disposed in the strain element 12 can be improved.

Also, in the detector 10 according to the first embodiment, the IC 23 and the communication antenna 24 are provided at the planar portion 16A.

Accordingly, in the detector 10 according to the first embodiment, the strain sensing sensor 21, the IC 23, and the communication antenna 24 can be placed consolidated at one place at the planar portion 16A of the strain element 12. Thus, according to the detector 10 of the first embodiment, reduction in size of the detector 10 can be realized.

Also, the detector 10 according to the first embodiment may further include the sealing resin 25 that seals the planar portion 16A.

Accordingly, in the detector 10 according to the first embodiment, the strain sensing sensor 21, the IC 23, and the communication antenna 24 can be collectively protected by the sealing resin 25. Thus, according to the detector 10 of the first embodiment, lifetime can be extended for these plurality of components.

Second Embodiment

Overview of Detector 50

Figure 8:
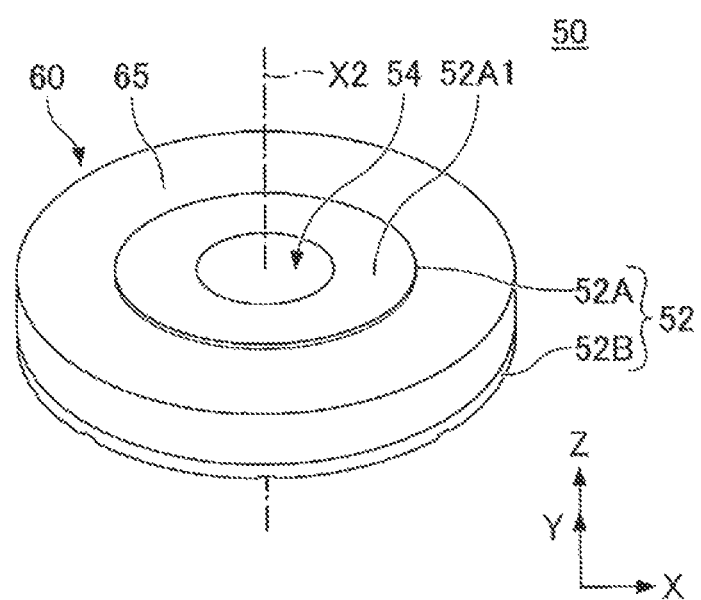
FIG. 8 is a perspective view illustrating an outer appearance of an upper face side of a detector according to a second embodiment.

FIG. 8 is a perspective view illustrating an outer appearance of an upper face side of a detector 50 according to a second embodiment. The detector 50 illustrated in FIG. 8 is a device having a generally cylindrical form. By disposing the detector 50 between a fastening member (bolt or nut) and a fastened member at the time of the fastened member being screwed to a predetermined attachment face (e.g., a wall face), the detector 50 can detect fastening axial force applied in an axial direction of a center axis X2 due to fastening of the fastening member.

As illustrated in FIG. 8, the detector 50 includes a strain element 52 and a strain sensing module 60. The strain element 52 includes a base portion 52A that has a cylindrical form, and a protruding portion 52B that has a thin-plate form, provided protruding from an outer side (outer circumferential face) at a lower end portion of the base portion 52A in a horizontal direction (direction orthogonal to the axial direction of the center axis X2) (see FIG. 10). That is to say, in plan view from above (Z-axial positive direction), the protruding portion 52B has an annular form surrounding the base portion 52A (see FIGS. 11A and 11B). The strain element 52 is formed with a metal material such as stainless steel or the like being suitably used, for example. Note that the base portion 52A and the protruding portion 52B are integrally formed. Also, a through hole 54 that passes through the strain element 52 in the up-down direction (Z-axial direction) following the center axis X2 is formed in the center of the strain element 52. The through hole 54 is a portion through which the bolt portion belonging to the fastening unit 42 (see FIG. 14) passes. An upper face 52A1 of the base portion 52A may be annular and planar in form, and function as a planar receiving portion for receiving the fastening member (bolt or nut).

Figure 9:
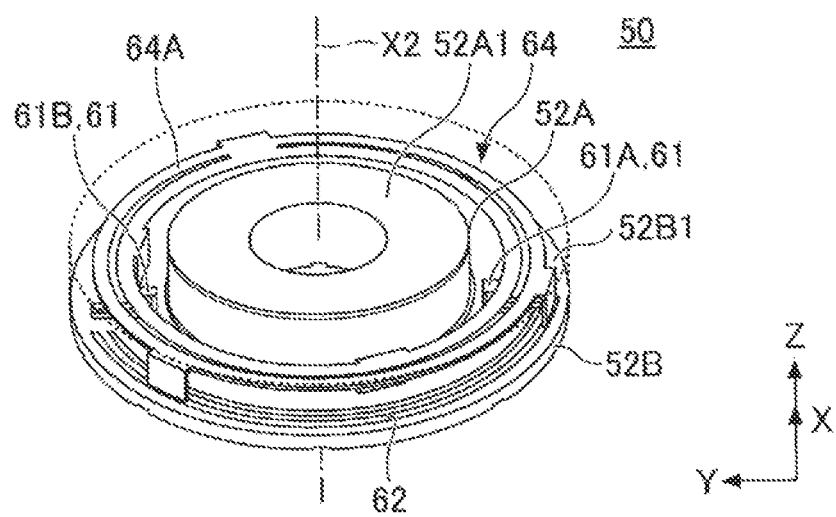
FIG. 9 is a perspective view illustrating an outer appearance of the upper face side of the detector according to the second embodiment.

The strain sensing module 60 is provided on an upper face 52B1 of the protruding portion 52B of the strain element 52 (see FIG. 9). The strain sensing module 60 can detect strain of the strain element 52, and externally output strain detection signals representing the magnitude of the detected strain as voltage values by wireless communication. As illustrated in FIG. 8, the strain sensing module 60 includes sealing resin 65. The sealing resin 65 covers the entirety of the other component parts of the strain sensing module 60 and an upper face of the protruding portion 52B of the strain element 52, thereby protecting the other component parts and the upper face of the protruding portion 52B from rainwater, soiling, and so forth. Also, the sealing resin 65 is formed in a form following an outer form of the strain element 52 so as not to look unnatural. Specifically, the sealing resin 65 is formed in a cylindrical form having an outer diameter that is generally the same size as the diameter of the protruding portion 52B, and having an inner diameter that is generally the same size as the diameter of the base portion 52A. However, this is not limiting, and an outer form of the sealing resin 65 may be any form. For example, the outer form of the sealing resin 65 may be a form that is formed to appear natural by potting.

Configuration of Strain Sensing Module 60

Figure 10:
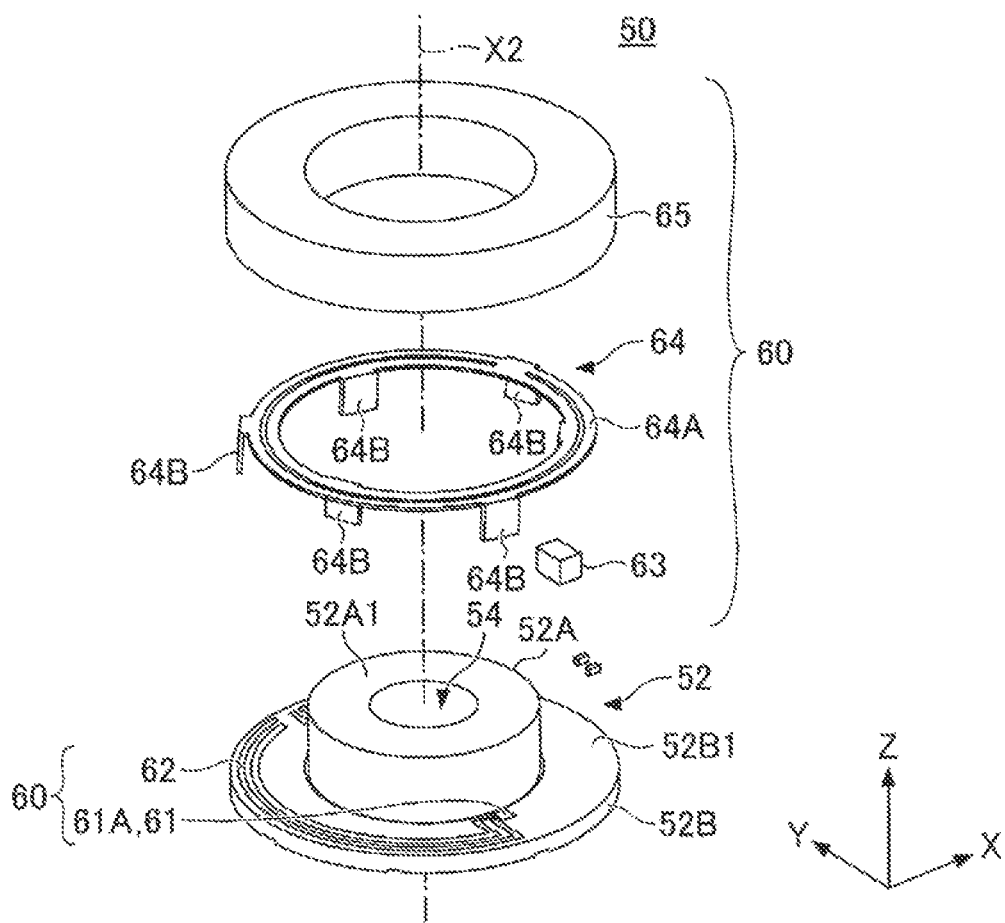
FIG. 10 is an exploded perspective view of the detector according to the second embodiment.

FIG. 9 is a perspective view illustrating an outer appearance of the upper face side of the detector 50 according to the second embodiment. FIG. 10 is an exploded perspective view of the detector 50 according to the second embodiment. Note however, that the sealing resin 65 of the strain sensing module 60 is illustrated as being transparent in FIG. 9.

As illustrated in FIGS. 9 and 10, the strain sensing module 60 may include a strain sensing sensor 61, a wiring pattern 62, an IC 63, a communication antenna 64, and the sealing resin 65.

The strain sensing sensor 61 has a first strain detecting element 61A and a second strain detecting element 61B. Each of the strain detecting elements 61A and 61B is placed on the upper face 52B1 of the protruding portion 52B of the strain element 52. Specifically, the strain detecting elements 61A and 61B may be placed at positions on the upper face 52B1 facing each other across the center axis X2. Each of the strain detecting elements 61A and 61B detects strain of the strain element 52. For example, each of the strain detecting elements 61A and 61B uses a strain resistor element of which the resistance value changes in accordance with the amount of strain. The strain detecting elements 61A and 61B make up a bridge circuit 70 (see FIG. 12). Note that the respective placement positions of the strain detecting elements 61A and 61B will be described later with reference to FIGS. 11A and 11B.

The wiring pattern 62 is a band-like member that has electroconductivity, formed on the upper face 52B1 of the protruding portion 52B, connecting each of the strain detecting elements 61A and 61B to the IC 63, and also connecting the communication antenna 64 and the IC 63. The wiring pattern 62 is used for transmission of strain detection signals between each of the strain detecting elements 61A and 61B and the IC 63, and between the communication antenna 64 and the IC 63. The wiring pattern 62 is formed using, for example, a thin-film conductor (e.g., copper foil).

The IC 63 is an example of a "control circuit". The IC 63 is disposed at the upper face 52B1 of the protruding portion 52B, and controls operations of the strain sensing module 60. For example, the IC 63 acquires strain detection signals representing the magnitude of strain of the strain element 52 from the bridge circuit 70 made up of the strain detecting elements 61A and 61B via the wiring pattern 62. The IC 63 then wirelessly transmits the strain detection signals acquired from the bridge circuit 70 to an external device, using the communication antenna 64.

The communication antenna 64 is used for transmitting strain detection signals. The communication antenna 64 includes a radiating plane 64A that is annular in form and that is formed from a thin-plate and band-like conductor. The radiating plane 64A is placed in parallel with the upper face 52B1 of the protruding portion 52B, and also separated from the upper face 52B1. The communication antenna 64 is connected to the wiring pattern 62 formed on the upper face 52B1 of the protruding portion 52B by a plurality of legs 64B that are provided on each of an outer circumferential edge portion and an inner circumferential edge portion of the radiating plane 64A and that are perpendicular to the radiating plane 64A.

Placement Positions of Strain Detecting Elements 61A and 61B

Figure 11A:
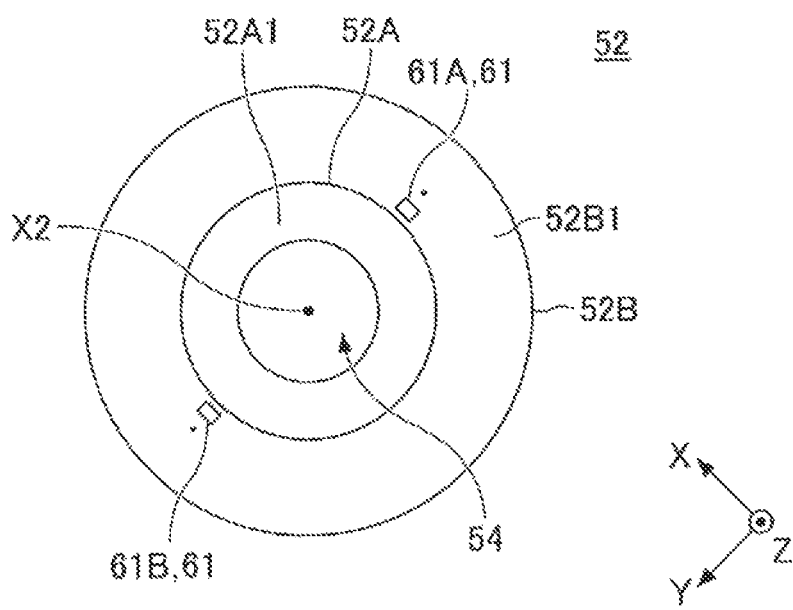
FIG. 11A is a diagram illustrating placement positions of strain detecting elements in the detector according to the second embodiment.
Figure 11B:
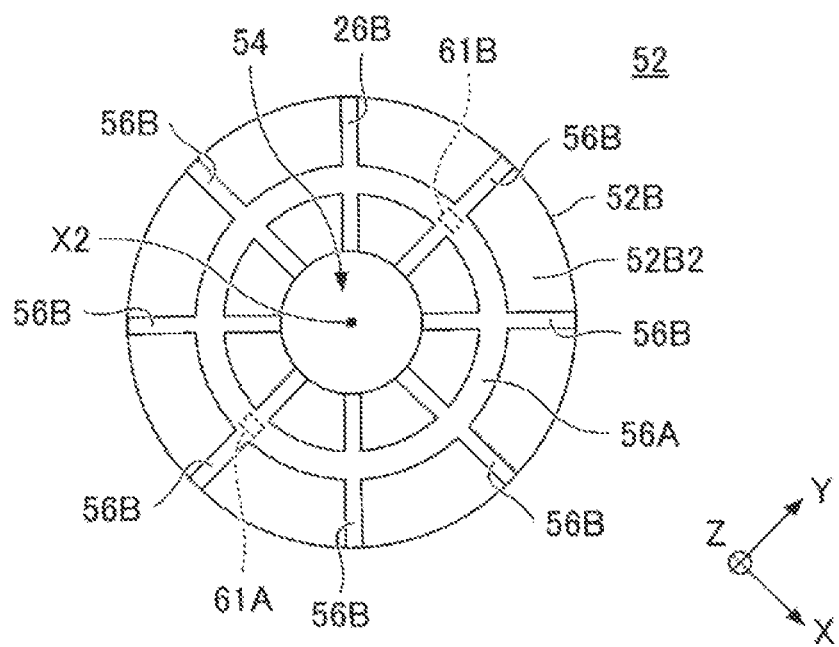
FIG. 11B is a diagram illustrating placement positions of the strain detecting elements in the detector according to the second embodiment.

FIGS. 11A and 11B are diagrams illustrating placement positions of the strain detecting elements 61A and 61B in the detector 50 according to the second embodiment. FIG. 11A represents a state of viewing the upper face 52B1 of the strain element 52 in plan view. FIG. 11B represents a state of viewing a bottom face 52B2 of the strain element 52 in plan view.

As illustrated in FIGS. 11A and 11B, the first strain detecting element 61A and the second strain detecting element 61B may be placed on the upper face 52B1 of the protruding portion 52B of the strain element 52 at positions facing each other across the center axis X2 (rotationally-symmetrical positions). The first strain detecting element 61A is disposed on a rear side (Y-axial negative side) from the center axis X2, and the second strain detecting element 61B is disposed on a front side (Y-axial positive side) from the center axis X2.

Also, as illustrated in FIG. 11B, a first groove portion 56A that is centered on the center axis X2 and is ring-like, and a plurality (eight at 45° intervals in the example illustrated in FIG. 11B) of second groove portions 56B linearly extending in the radial direction from the center axis X2, are formed in the bottom face 52B2 of the strain element 52. These groove portions (first groove portion 56A and second groove portions 56B) are groove-like forms recessed in the protruding portion 52B toward the upper face 52B1 side of the protruding portion 52B.

As illustrated in FIG. 11B, each of the first strain detecting element 61A and the second strain detecting element 61B is placed at a position on the upper face 52B1 of the protruding portion 52B facing an intersection of the first groove portion 56A and a second groove portion 56B.

These disposing positions are positions at which greater negative strain (strain in a tensile direction) occurs at each of the first strain detecting element 61A and the second strain detecting element 61B when fastening axial force is applied to the strain element 52 in the axial direction of the center axis X2, and have been found through simulation performed by the inventors of the present invention.

Note that the strain detecting elements 61A and 61B can be disposed on the upper face 52B1 of the protruding portion 52B by various disposing methods.

For example, the strain detecting elements 61A and 61B may be directly bonded to the upper face 52B1 of the protruding portion 52B by an adhesive agent or the like. In this case as well, the installation face is a flat face, and accordingly the strain detecting elements 61A and 61B can be disposed at predetermined disposing positions on the upper face 52B1 easily and in a sure manner.

Alternatively, for example, the strain detecting elements 61A and 61B may be formed on the upper face 52B1 by printing composite resistors of a cermet or of which the binder is a synthetic resin on the upper face 52B1 of the protruding portion 52B. In this case as well, the strain detecting elements 61A and 61B can be disposed at predetermined disposing positions on the upper face 52B1 easily and in a sure manner. Particularly, in a case of printing, a plurality of the strain elements 52 can be arrayed, and in this state the plurality of strain elements 52 can be subjected to batch printing, drying, and hardening of the strain detecting elements 61A and 61B. Accordingly, the strain detecting elements 61A and 61B can be disposed on the plurality of strain elements 52 easily and in a sure manner.

Also, for example, the strain detecting elements 61A and 61B may be mounted on a rigid board or a flexible board, and in this state be bonded to the upper face 52B1 of the protruding portion 52B along with the rigid board or the flexible board. In this case as well, the installation face is a flat face, and accordingly the strain detecting elements 61A and 61B can be disposed at predetermined disposing positions on the upper face 52B1 easily and in a sure manner.

Configuration of Bridge Circuit 70

Figure 12:
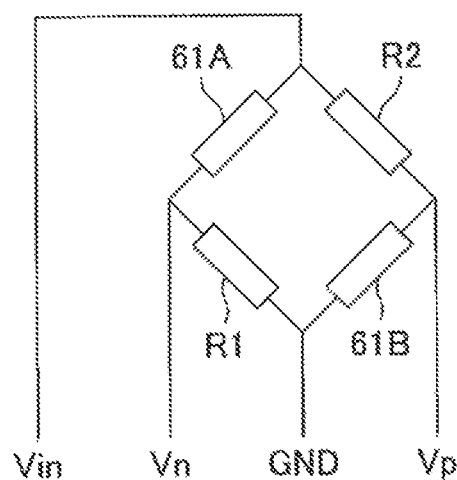
FIG. 12 is a circuit diagram of a bridge circuit included in the detector according to the second embodiment.

FIG. 12 is a circuit diagram of the bridge circuit 70 included in the detector 50 according to the second embodiment. As illustrated in FIG. 12, the bridge circuit 70 is configured including the strain detecting elements 61A and 61B, and resistors R1 and R2.

In the bridge circuit 70 illustrated in FIG. 12, the more the fastening axial force on the strain element 52 increases in the axial direction of the center axis X2, the smaller the resistance values of the strain detecting elements 61A and 61B become.

Accordingly, in the bridge circuit 70, the more the fastening axial force on the strain element 52 increases in the axial direction of the center axis X2, the greater a voltage value Vp at a contact point between the strain detecting element 61B and the resistor R2 becomes. Also, the more the fastening axial force on the strain element 52 increases in the axial direction of the center axis X2, the smaller a voltage value Vn at a contact point between the strain detecting element 61A and the resistor R1 becomes.

The bridge circuit 70 amplifies and outputs voltage difference between the voltage value Vp and the voltage value Vn by a differential amplifier (omitted from illustration). Accordingly, the bridge circuit 70 can output strain detection signals in which the voltage value becomes great as the fastening axial force increases on the strain element 52 in the axial direction on the center axis X2.

Note that a tightening torque of the fastening member, and the fastening axial force on the strain element 52 in the axial direction on the center axis X2 are in a proportional relation with each other. That is to say, as the tightening torque of the fastening member increases, the fastening axial force on the strain element 52 in the axial direction on the center axis X2 increases. Accordingly, the bridge circuit 70 can output strain detection signals of which the voltage value increases as the tightening torque of the fastening member increases.

Example of Dimensions of Portions of Detector 50

Figure 13:
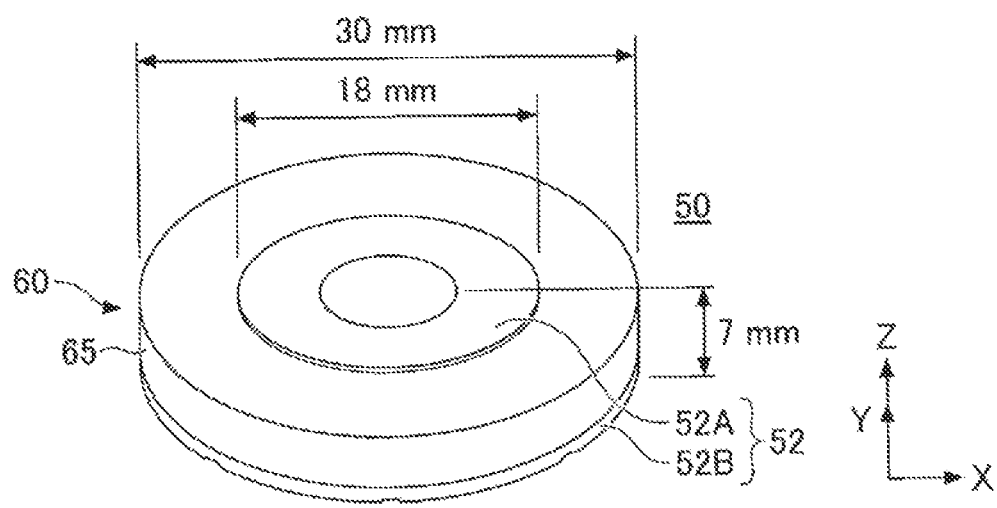
FIG. 13 is a diagram illustrating an example of dimensions of portions of the detector according to the second embodiment.

FIG. 13 is a diagram illustrating an example of dimensions of portions of the detector 50 according to the second embodiment. FIG. 13 illustrates an example of dimensions of the portions of the detector 50 in a case in which the detector 50 is for being attached to a bolt shaft that is 8 mm in diameter. In the example illustrated in FIG. 13, the lateral width (width in the X-axial direction) of the detector 50 is 30 mm. Also, the diameter of the base portion 52A of the strain element 52 is 18 mm. Also, the up-down width (width in Z-axial direction) of the detector 50 is 7 mm.

Usage Example of Detector 50

Figure 14:
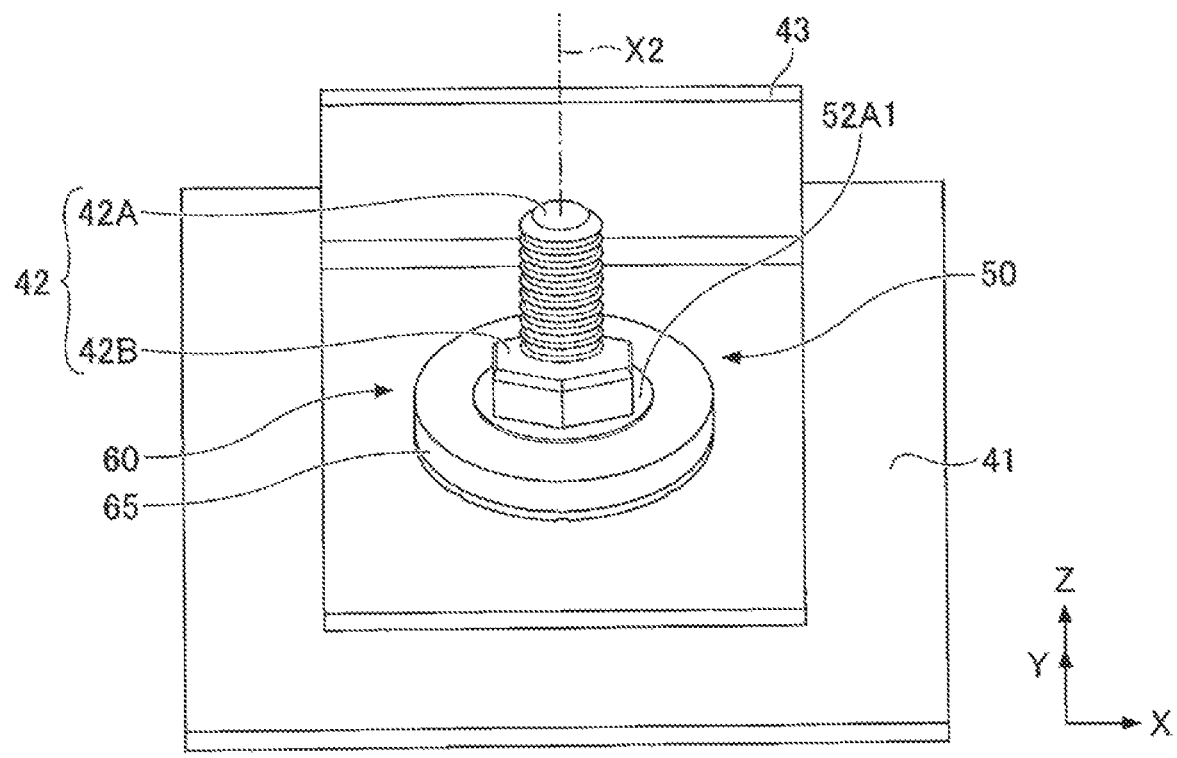
FIG. 14 is a diagram illustrating a usage example of the detector according to the second embodiment.

FIG. 14 is a diagram illustrating a usage example of the detector 50 according to the second embodiment. FIG. 14 represents an example in which the fastened member 43 that is plate-like in form is fixed by screwing to the attachment face 41, by the nut 42B.

In the example illustrated in FIG. 14, the detector 50 is provided between the nut 42B and the fastened member 43. The bolt shaft 42A, which extends upward from the attachment face 41, passes through the fastened member 43 and the base portion 52A of the strain element 52 of the detector 50. The basal end portion (end portion on the Z-axial negative side) of the bolt shaft 42A is fixed to the attachment face 41. The nut 42B is screwed down on the bolt shaft 42A from the distal end portion (end portion on the Z-axial positive side) side of the bolt shaft 42A. The nut 42B makes up the fastening unit 42 along with the bolt shaft 42A.

In the example illustrated in FIG. 14, when the nut 42B is screwed down, the fastened member 43 and the detector 50 are fixed to the attachment face 41. At this time, the strain element 52 of the detector 50 receives the nut 42B at upper face 52A1 of the base portion 52A. Thus, the fastening axial force in the axial direction (Z-axial direction) of the bolt shaft 42A is applied to the strain element 52. Now, the diameter of the upper face 52A1 is larger than the maximum diameter (length of diagonal line) of the nut. Accordingly, the strain element 52 can receive the fastening axial force applied by the nut 42B in a surer manner, by the upper face 52A1 of the base portion 52A.

As a result, strain that corresponds to the tightening torque of the nut 42B occurs in the strain element 52. The strain occurring in the strain element 52 is detected by each of the strain detecting elements 61A and 61B (see FIGS. 10 to 12) included in the strain sensing module 60 of the detector 50. The bridge circuit 70 (see FIG. 12) included in the strain sensing module 60 then outputs strain detection signals corresponding to the tightening torque of the nut 42B to the IC 63 included in the strain sensing module 60, on the basis of the strain detected by each of the strain detecting elements 61A and 61B (i.e., change in resistance values of each of the strain detecting elements 61A and 61B). The IC 63 outputs the strain detection signals acquired from the bridge circuit 70 to an external device via wireless communication. For example, the external device can judge the tightening state of the nut 42B on the basis of voltage values indicated by the strain detection signals acquired from the detector 50.

Note that various types of output methods can be employed as the output method of strain detection signals by the strain sensing module 60. For example, when a tag reader is held up to the strain sensing module 60, the strain sensing module 60 may generate electric power by an electromotive coil, and use this electric power to perform wireless transmission of the strain detection signals to the tag reader. In this case, the strain sensing module 60 may have a configuration that does not include a battery or memory. However, this is not limiting, and the strain sensing module 60 may have a configuration that includes at least one of a battery and memory.

As described earlier, the detector 50 according to the second embodiment is a detector 50 that detects fastening axial force applied on the center axis X2 direction by the fastening unit 42, and includes the strain element 52 having the through hole 54 through which the bolt portion having the fastening unit 42 is passed, and the strain sensing sensor 61 that senses strain of the strain element 52. The strain element 52 includes the base portion 52A that is block-like and has the through hole 54, and the protruding portion 52B that is thin-plate like and is provided protruding from the outer side of the base portion 52A in a direction intersecting the center axis X2 direction (horizontal direction), and the strain sensing sensor 61 is provided on the protruding portion 52B.

Accordingly, in the detector 50 according to the second embodiment, the strain sensing sensor 61 can be disposed on the protruding portion 52B that is thin-plate like where strain readily occurs in the strain element 52, and accordingly even slight loosening of the fastening member can be detected. Thus, according to the detector 50 of the second embodiment, the precision of the strain element 52 sensing strain by the strain sensing sensor 61 disposed on the protruding portion 52B of the strain element 52 can be improved.

Also, in the detector 50 according to the second embodiment, the protruding portion 52B may be provided on the end portion of the bottom face side of the base portion 52A, and may be formed with a flange-like form from an outer circumference of the end portion in a direction orthogonal to the center axis X2 direction (horizontal direction).

Accordingly, in the detector 50 according to the second embodiment, the protruding portion 52B is provided on the bottom face side of the base portion 52A, and thus the effects at the bottom face side where strain of the base portion 52A is great can be directly received. In particular, in the detector 50 according to the second embodiment, the protruding portion 52B is formed in a flange-like form surrounding the outer circumference of the base portion 52A, and accordingly strain of the base portion 52A can be received with the entirety of the protruding portion 52B. Accordingly, in the detector 50 according to the second embodiment, strain in the base portion 52A of the strain element 52 can be conveyed to the protruding portion 52B in a sure manner, and the precision of the strain element 52 sensing strain by the strain sensing sensor 61 disposed on the protruding portion 52B of the strain element 52 can be improved further.

Also, in the detector 50 according to the second embodiment, the bottom face of the protruding portion 52B has the groove portions 56A and 56B that are recessed toward the upper face side of the protruding portion 52B, the strain sensing sensor 61 is provided on the upper face 52B1 of the protruding portion 52B, and placed at a position facing the groove portions 56A and 56B.

Thus, in the detector 50 according to the second embodiment, the strain sensing sensor 61 is placed at a position of the protruding portion 52B where strain occurs even more readily, and accordingly strain of the strain element 52 can be sensed in an even more sure manner. Therefore, according to the detector 50 of the second embodiment, and the precision of the strain element 52 sensing strain by the strain sensing sensor 61 disposed on the strain element 52 can be improved further.

Also, in the detector 50 according to the second embodiment, the strain sensing sensor 61 may have the first strain detecting element 61A and the second strain detecting element 61B that are placed at positions of the protruding portion 52B facing each other across the center axis X2 of the through hole 54.

Accordingly, the detector 50 according to the second embodiment can detect strain at two positions in the horizontal direction of the protruding portion 52B of the strain element 52, and this strain of the strain element 52 can be detected with a high level of precision. Therefore, according to the detector 50 of the second embodiment, the precision of the strain element 52 sensing strain by the strain sensing sensor 61 disposed on the strain element 52 can be improved further.

Also, in the detector 50 according to the second embodiment, the strain element 52 may have a planar receiving portion on the upper face 52A1 that surrounds the through hole 54 and that receives the fastening member that the fastening unit 42 has.

Accordingly, the detector 50 according to the second embodiment can receive fastening axial force applied from the fastening member in a surer manner by the receiving portion. That is to say, the fastening state of the fastening member can be converted into strain of the strain element 52 in a surer manner. Therefore, according to the detector 50 of the second embodiment, the precision of the strain element 52 sensing strain by the strain sensing sensor 61 disposed in the strain element 52 can be improved further.

Also, the detector 50 according to the second embodiment further includes the IC 63 and the communication antenna 64.

Accordingly, the detector 50 according to the second embodiment can externally output highly-precise sensing data representing strain of the strain element 52 that is sensed by the strain sensing sensor 61, by wireless communication. Thus, according to the detector 50 of the second embodiment, external precision of the strain element 52 sensing strain by the strain sensing sensor 61 disposed in the strain element 52 can be improved.

Also, in the detector 50 according to the second embodiment, the IC 63 and the communication antenna 64 are provided at the protruding portion 52B.

Accordingly, in the detector 50 according to the second embodiment, the strain sensing sensor 61, the IC 63, and the communication antenna 64 can be placed consolidated at one place at the protruding portion 52B. Thus, according to the detector 50 of the second embodiment, reduction in size of the detector 50 can be realized.

Also, the detector 50 according to the second embodiment may further include the sealing resin 65 that seals the protruding portion 52B.

Accordingly, in the detector 50 according to the second embodiment, the strain sensing sensor 61, the IC 63, and the communication antenna 64 can be collectively protected by the sealing resin 65. Thus, according to the detector 50 of the second embodiment, lifetime can be extended for these plurality of components.

Third Embodiment

System Configuration of Detecting System 100

FIG. 15 is a diagram illustrating a system configuration of a detecting system 100 according to a third embodiment. As illustrated in FIG. 15, the detecting system 100 is configured including a detector 120 and a reading device 140

The detector 120 is a device that detects fastening axial force applied in the axial direction by a fastening unit. As illustrated in FIG. 15, the detector 120 includes a first strain sensing sensor 122, a second strain sensing sensor 123, and a control circuit 124.

The first strain sensing sensor 122 is disposed on a planar side face of a strain element 121, and senses strain in a center axis X3 direction of the strain element 121. The first strain sensing sensor 122 outputs a first detection value representing strain in the axial direction of the strain element 121 that is sensed.

The second strain sensing sensor 123 is disposed on the planar side face of the strain element 121, and senses strain in a radial direction (direction orthogonal to center axis X3 direction) of the strain element 121. The second strain sensing sensor 123 outputs a second detection value representing strain in the radial direction of the strain element 121 that is sensed.

Note that the first strain sensing sensor 122 and the second strain sensing sensor 123 have same temperature properties as each other.

The control circuit 124 has an antenna 124A. The control circuit 124 wirelessly transmits a difference value between the first detection value detected by the first strain sensing sensor 122 and the second detection value detected by the second strain sensing sensor 123 to the reading device 140 via the antenna 124A. The control circuit 124 also wirelessly transmits a wireless ID of the detector 120 to the reading device 140 via the antenna 124A.

The reading device 140 is a device that acquires various types of information from the detector 120. As illustrated in FIG. 15, the reading device 140 has a main unit 140A and a cover 140B.

Figure 17:
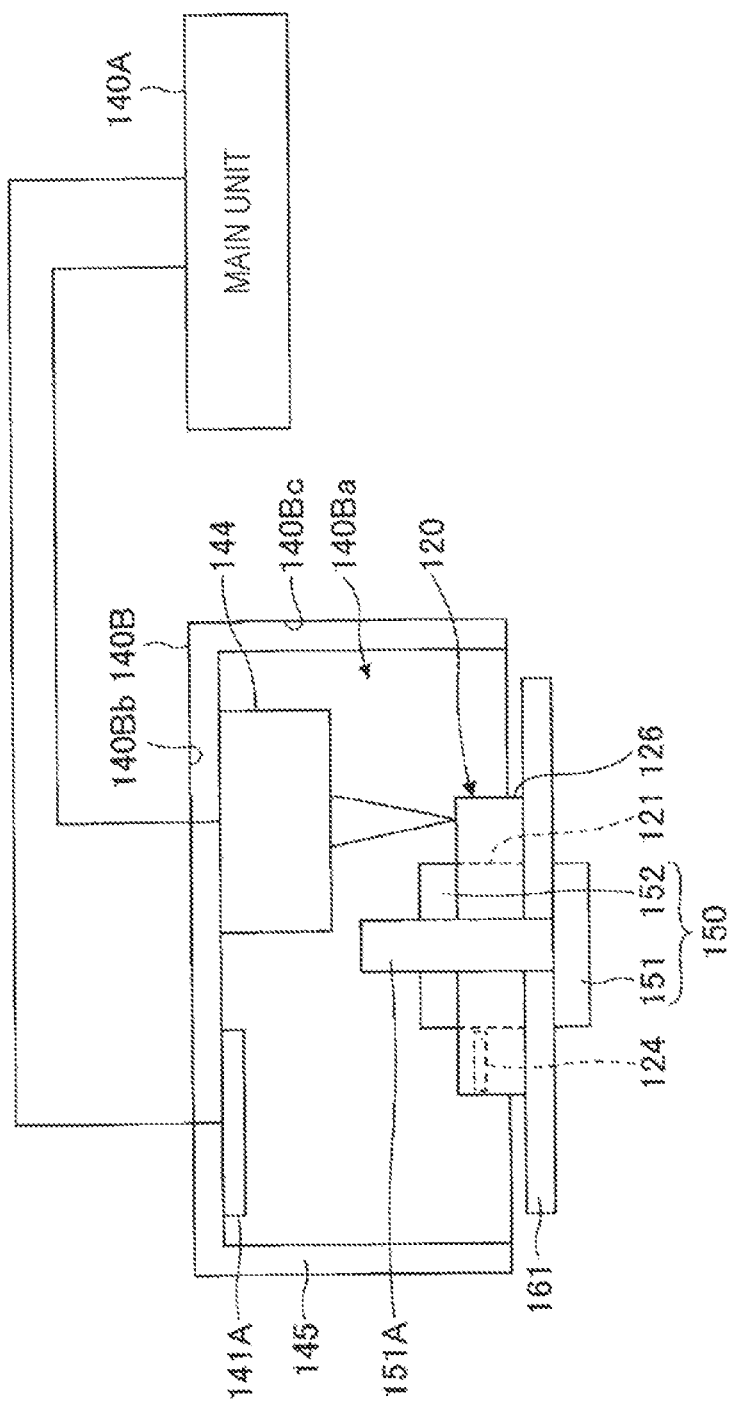
FIG. 17 is a diagram illustrating a configuration of a cover included in a reading device according to the third embodiment.

The cover 140B is a container-like member with a bottom face opened, which is placed so as to cover above the detector 120 when acquiring various types of information from the detector 120 (see FIG. 17). The cover 140B has an antenna 141A and a radiation thermometer 144. The antenna 141A receives various types of information (difference value of first detection value and second detection value, and wireless ID) wirelessly transmitted from the detector 120. The radiation thermometer 144 performs contactless measurement of the temperature of the detector 120. The radiation thermometer 144 then outputs a temperature measurement value representing the measured temperature of the detector 120.

The main unit 140A is provided in a separate entity from the cover 140B. The main unit 140A has a communication unit 141 and a control unit 143. A personal computer (PC), for example, is used as the main unit, but is not limited thereto.

The communication unit 141 is connected to the antenna 141A provided to the cover 140B. The communication unit 141 receives various types of information (difference value of first detection value and second detection value, and wireless ID) wirelessly transmitted from the detector 120, via the antenna 141A. Specifically, the communication unit 141 outputs radio waves that conform to a wireless ID protocol to the detector 120, via the antenna 141A. The control circuit 124 of the detector 120 receives signals output from the communication unit 141, and accordingly generates electric power for driving the sensor and IC. The control circuit 124 of the detector 120 transmits the various types of information (difference value of first detection value and second detection value, and wireless ID) to the reading device 140 by reflected waves of the radio waves from the reading device 140. Accordingly, the communication unit 141 of the reading device 140 receives the various types of information (difference value of first detection value and second detection value, and wireless ID) transmitted from the detector 120, via the antenna 141A. Note that in the present embodiment, a 920 MHz band is used for the frequency of the wireless communication between the reading device 140 and the detector 120, but another frequency band may be used instead.

The control unit 143 performs various types of control in the reading device 140. For example, the control unit 143 performs acquisition of various types of information (difference value of first detection value and second detection value, wireless ID, temperature measurement value), temperature correction of data acquired from the detector 120, looseness determination of the fastening member based on data acquired from the detector 120, notification of looseness determination results to workers, recording of looseness determination results, exchange of various types of information with an external device (e.g., a server or the like), and so forth.

Configuration of Detector 120

Figure 16:
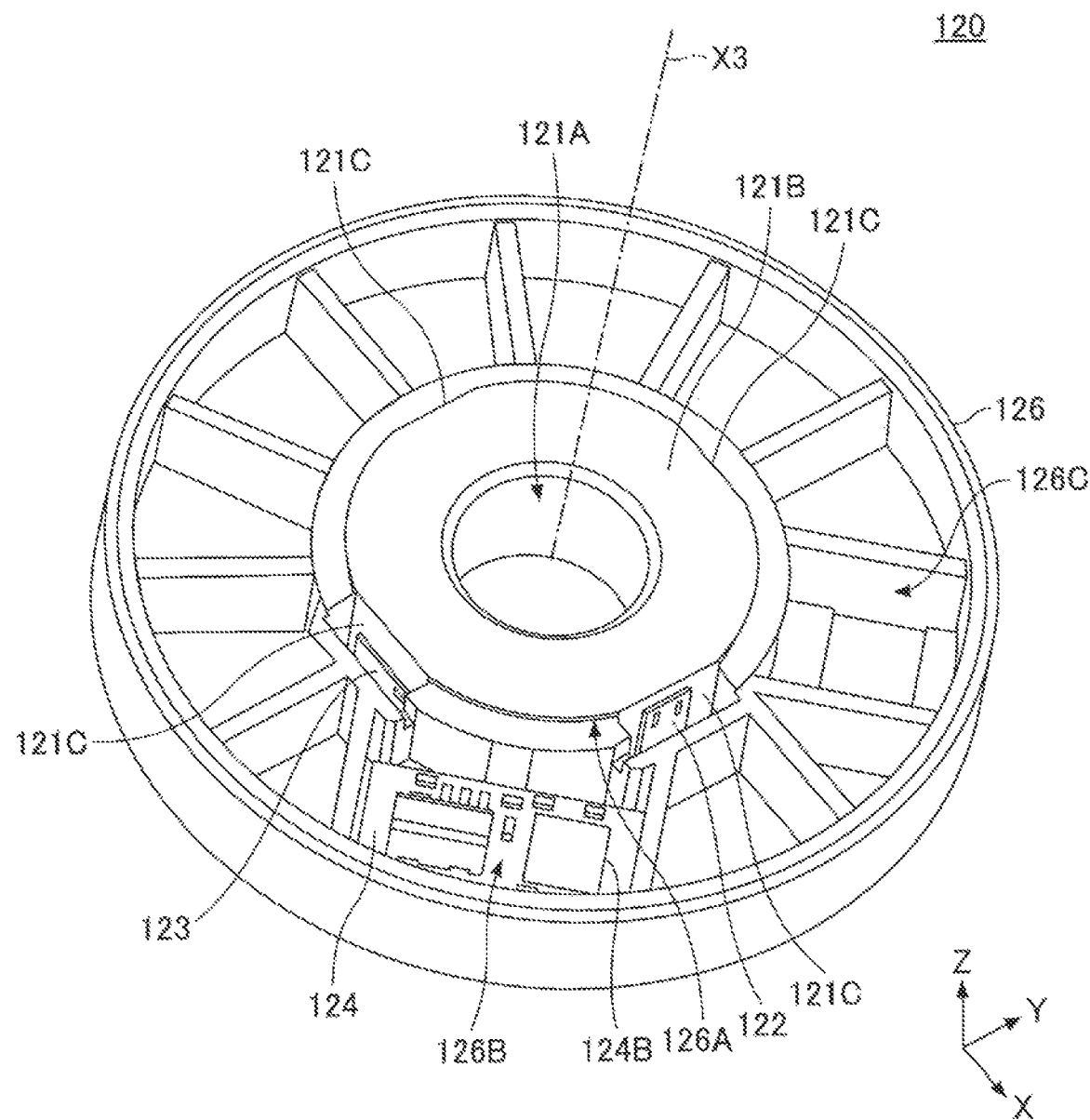
FIG. 16 is a perspective view illustrating an outer appearance of an upper face side of a detector according to the third embodiment.

FIG. 16 is a perspective view illustrating an outer appearance of an upper face side of the detector 120 according to the third embodiment. The detector 120 illustrated in FIG. 16 is a device that has the strain element 121 having a generally cylindrical form. By disposing the detector 120 between a fastening member (bolt or nut) and a fastened member at the time of the fastened member being screwed to a predetermined attachment face (e.g., a wall face), the detector 120 can detect fastening axial force applied in an axial direction of the center axis X3 due to fastening of the fastening member.

As illustrated in FIG. 16, the detector 120 includes the strain element 121, the first strain sensing sensor 122, the second strain sensing sensor 123, the control circuit 124, and a case 126.

The strain element 121 is a block-like member that has a generally cylindrical form. A metal material such as stainless steel or the like, for example, is suitably used to form the strain element 121. A through hole 121A that passes through the strain element 121 in the up-down direction (Z-axial direction) following the center axis X3 is formed in the center of the strain element 121. The through hole 121A is a portion through which a bolt portion belonging to fastening unit passes.

Also, as illustrated in FIG. 16, an upper face 121B of the strain element 121 is planar in form. Accordingly, the upper face 121B of the strain element 121 may function as a planar receiving portion for receiving a fastening member (bolt or nut).

Also, as illustrated in FIG. 16, four planar portions 121C that are planar in form are formed on a circumferential face of the strain element 121, at 90° intervals. One pair of the planar portions 121C are parallel with each other across the through hole 121A, and each thereof is parallel to the Y-Z plane. The other pair of the planar portions 121C are parallel with each other across the through hole 121A, and each thereof is parallel to the X-Z plane. The four planar portions 121C are formed by cutting away part of the outer circumferential face of the strain element 121 that is cylindrical in form before machining, parallel to the X-Z plane or the Y-Z plane, for example.

The first strain sensing sensor 122 is provided on one planar portion 121C out of the four planar portions 121C of the strain element 121. The first strain sensing sensor 122 detects strain of the strain element 121 in the center axis X3 direction as a first detection value, and outputs this first detection value to the control circuit 124. For example, the first strain sensing sensor 122 is placed on the planar portion 121C such that positive strain (strain in the compression direction) occurs in a strain detecting element.

Figure 24:
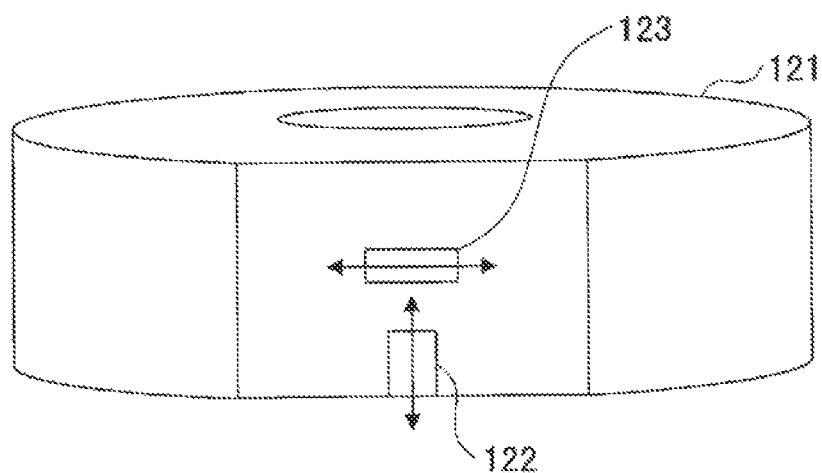
FIG. 24 is a diagram illustrating a first modification of disposing positions of the sensors in a strain element according to the third embodiment.
Figure 25:
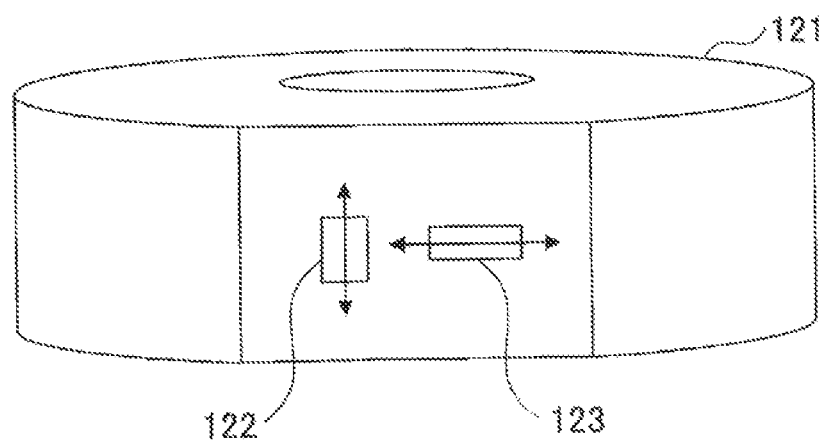
FIG. 25 is a diagram illustrating a second modification of disposing positions of the sensors in a strain element according to the third embodiment.

The second strain sensing sensor 123 is provided on another one planar portion 121C out of the four planar portions 121C of the strain element 121. The second strain sensing sensor 123 detects strain of the strain element 121 in the radial direction as a second detection value, and outputs this second detection value to the control circuit 124. For example, the second strain sensing sensor 123 is placed on the planar portion 121C such that negative strain (strain in the tensile direction) occurs in a strain detecting element. Note that the second strain sensing sensor 123 may be inflexible and have fixed resistance. Also, although four planar portions 121C are formed on the outer circumferential face of the strain element 121 in the example illustrated in FIG. 16, this is not restrictive. For example, one planar portion 121C may be formed on the outer circumferential face of the strain element 121, with two strain sensing sensors 122 and 123 placed on this one planar portion 121C, as illustrated in FIGS. 24 and 25.

The control circuit 124 is provided on an outer side from the outer circumferential face of the strain element 121, and within a first hollow portion 126B within the case 126. The control circuit 124 may have the antenna 124A (see FIG. 15), an IC 124B, and so forth. The control circuit 124 wirelessly transmits the difference value between the first detection value output by the first strain sensing sensor 122 and the second detection value output by the second strain sensing sensor 123 to the reading device 140, via the antenna 124A. The control circuit 124 also wirelessly transmits the wireless ID of the detector 120 stored in memory included in the control circuit 124 to the reading device 140, via the antenna 124A.

Note that the first detection value includes an error component due to temperature at the first strain sensing sensor 122, and the second detection value includes an error component due to temperature at the second strain sensing sensor 123. The first strain sensing sensor 122 and the second strain sensing sensor 123 have the same temperature properties as each other, and accordingly the error component of the first detection value and the error component of the second detection value are the same as each other. By wirelessly transmitting the difference value of the first detection value and the second detection value to the reading device 140, the control circuit 124 can wirelessly transmit the detection value from which the error components of both signals have been removed to the reading device 140. However, this is not restrictive, and the control circuit 124 may wirelessly transmit the first detection value and the second detection value to the reading device 140. In this case, the difference value of the first detection value and the second detection value may be calculated by the control unit 143 of the reading device 140.

The case 126 is an annular member that is enlarged in the radial direction on the outer side from the outer circumferential face of the strain element 121, and encompasses the outer circumferential face of the strain element 121. Note that FIG. 16 illustrates a state in which a lid portion of the case 126 is removed. The case 126 has an inner cylindrical portion 126A that passes through the case 126 in the up-down direction. The case 126 is integrated with the strain element 121 by fitting the strain element 121 into the inner cylindrical portion 126A. The case 126 is formed by injection molding of a resin material, for example. The case 126 has the first hollow portion 126B and a second hollow portion 126C. The control circuit 124 is placed in the first hollow portion 126B. Another control circuit can be additionally placed in the second hollow portion 126C. For example, in the third embodiment, the detector 120 wirelessly transmits both the difference value and the wireless ID by the control circuit 124. This is not restrictive, and a configuration may be made in which the detector 120 wirelessly transmits one of the difference value and the wireless ID, by another control circuit placed in the second hollow portion 126C.

Configuration of Cover 140B

FIG. 17 is a diagram illustrating the configuration of the cover 140B included in the reading device 140 according to the third embodiment. As illustrated in FIG. 17, the cover 140B is a container-like member of which the bottom face is open, which is placed so as to cover above and sideward of the detector 120 when acquiring various types of information from the detector 120 (i.e., when inspecting the fastening state of the fastening member). A top face 140Bb of the cover 140B is provided with the antenna 141A and the radiation thermometer 144. The antenna 141A is provided at a position facing the control circuit 124 of the detector 120, and receives various types of information (difference value of first detection value and second detection value, and wireless ID) wirelessly transmitted from the control circuit 124. The radiation thermometer 144 is provided at a position facing the upper face of the detector 120, and measures the temperature of the detector 120 by irradiation of the upper face of the detector 120 by infrared rays or visible light rays. The radiation thermometer 144 then outputs temperature measurement values representing the measured temperature to the main unit 140A.

The reading device 140 according to the third embodiment directly measures the temperature of the detector 120 by the radiation thermometer 144, and thus can measure the temperature thereof at positions near to the sensors 122 and 123 as compared to a case of measuring the temperature of the bolt. Also, the reading device 140 according to the third embodiment directly measures the temperature of the detector 120 by the radiation thermometer 144, whereby the antenna 141A can be brought even closer to the control circuit 124 as compared to a case of measuring the temperature of the bolt, and thus the communication precision between the antenna 141A and the control circuit 124 can be further improved. However, this is not restrictive, and the temperature of the bolt may be measured by the radiation thermometer 144.

The cover 140B is formed using a metal material that does not readily transmit radio waves (e.g., aluminum, iron, etc.), so that radio waves do not leak externally. Further, the cover 140B has a radio wave absorbing member 145 that is sheet-like applied over the entire face of the top face 140Bb and inner wall faces 140Bc exposed on an inner space 140Ba thereof, so that radio waves do not leak externally. An electroconductive radio wave absorbing material, a dielectric radio wave absorbing material, a magnetic radio wave absorbing material, or the like, is used as the radio wave absorbing member 145. Thus, the cover 140B is configured such that radio waves are not externally leaked, and thus erroneous detection of radio waves transmitted from other detectors 120 can be prevented even in a case in which a plurality of detectors 120 are disposed in close proximity.

Configuration of Control Circuit 124

Figure 18:
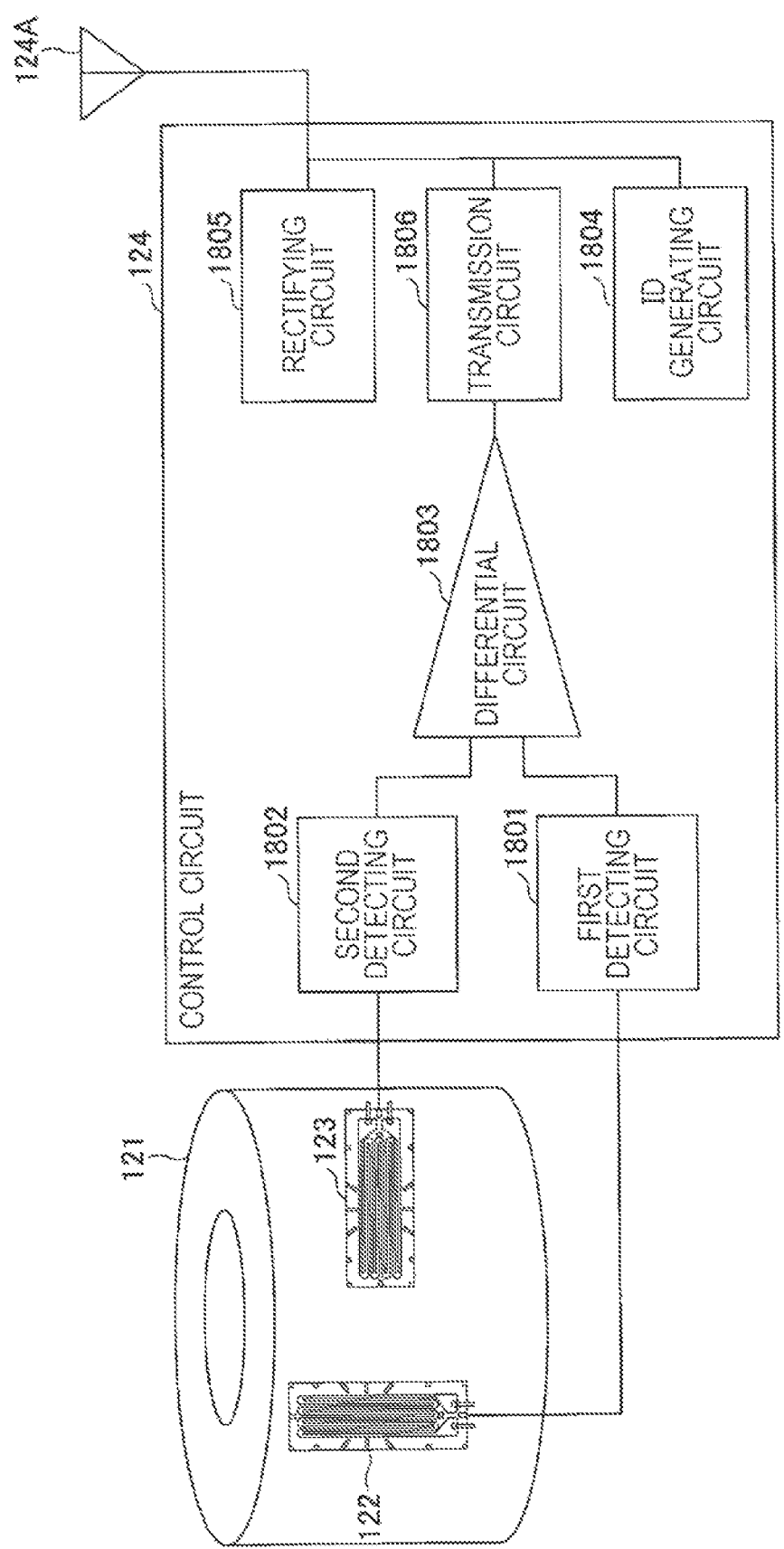
FIG. 18 is a diagram illustrating a configuration of a control circuit included in the detector according to the third embodiment.

FIG. 18 is a diagram illustrating the configuration of the control circuit 124 included in the detector 120 according to the third embodiment.

As illustrated in FIG. 18, the first strain sensing sensor 122 and the second strain sensing sensor 123 are provided on the outer circumferential face of the strain element 121. The strain element 121 that has a washer-like form shrinks in the center axis X3 direction by being fastened by the fastening member (bolt or nut), and stretches in the radial direction. The ratio of shrinking and stretching in the strain element 121 is determined by the Poisson's ratio of the material used in the strain element 121 and the form of the strain element 121.

At this time, the resistance value of the first strain sensing sensor 122 becomes lower due to shrinking along with the strain element 121, and accordingly strain on the strain element 121 in the center axis X3 direction is sensed. Also, at this time, the resistance value of the second strain sensing sensor 123 becomes higher due to being stretched along with the strain element 121, and accordingly strain on the strain element 121 in the radial direction (direction orthogonal to the center axis X3 direction) is sensed. Note that the second strain sensing sensor 123 may be inflexible and have fixed resistance.

The first detection value that is output from the first strain sensing sensor 122 to the control circuit 124 and the second detection value that is output from the second strain sensing sensor 123 to the control circuit 124 have opposite positive and negative signs.

Also, the first strain sensing sensor 122 and the second strain sensing sensor 123 have the same temperature properties as each other. Accordingly, the first detection value that is output from the first strain sensing sensor 122 and the second detection value that is output from the second strain sensing sensor 123 include error components due to effects of temperature that are the same as each other.

Also, as exemplified in FIG. 18, the control circuit 124 has a first detecting circuit 1801 that outputs the first detection value by driving the first strain sensing sensor 122, a second detecting circuit 1802 that outputs the second detection value by driving the second strain sensing sensor 123, and a differential circuit 1803. The difference value of the first detection value output from the first detecting circuit 1801 and the second detection value output from the second detecting circuit 1802 can be output by this differential circuit 1803.

Also, as exemplified in FIG. 18, the control circuit 124 has an ID generating circuit 1804, and can output a wireless ID of the detector 120 that is stored in the control circuit 124 by this ID generating circuit 1804.

Further, the control circuit 124 has a rectifying circuit 1805, a transmission circuit 1806, and the antenna 124A, and can wirelessly transmit the difference value of the first detection value and the second detection value, and the wireless ID of the detector 120, to the reading device 140 via this antenna 124A.

Accordingly, the control circuit 124 can wirelessly transmit, to the reading device 140, a detection value in which common components (error due to effects of temperature, noise, etc.) of the two sensors 122 and 123 are removed, yielding a sum of the change component of strain of the strain element 121 in the center axis X3 direction and the change component of strain of the strain element 121 in the radial direction.

Note that in the present embodiment, an IC that has an interface for sensors is used as the control circuit 124. Accordingly, the control circuit 124 is capable of not only transmitting the wireless ID, but also is capable of transmitting the difference value of the first detection value and the second detection value.

Also, the control circuit 124 can generate electric power by receiving radio waves output from the reading device 140, and can drive the sensors 122 and 123, and the control circuit 124, by this electric power. That is to say, the control circuit 124 is capable of operating even with no battery installed, and battery-related maintenance such as replacing batteries, charging, and so forth, is unnecessary.

Work Procedures of Control Circuit 124

Figure 19:
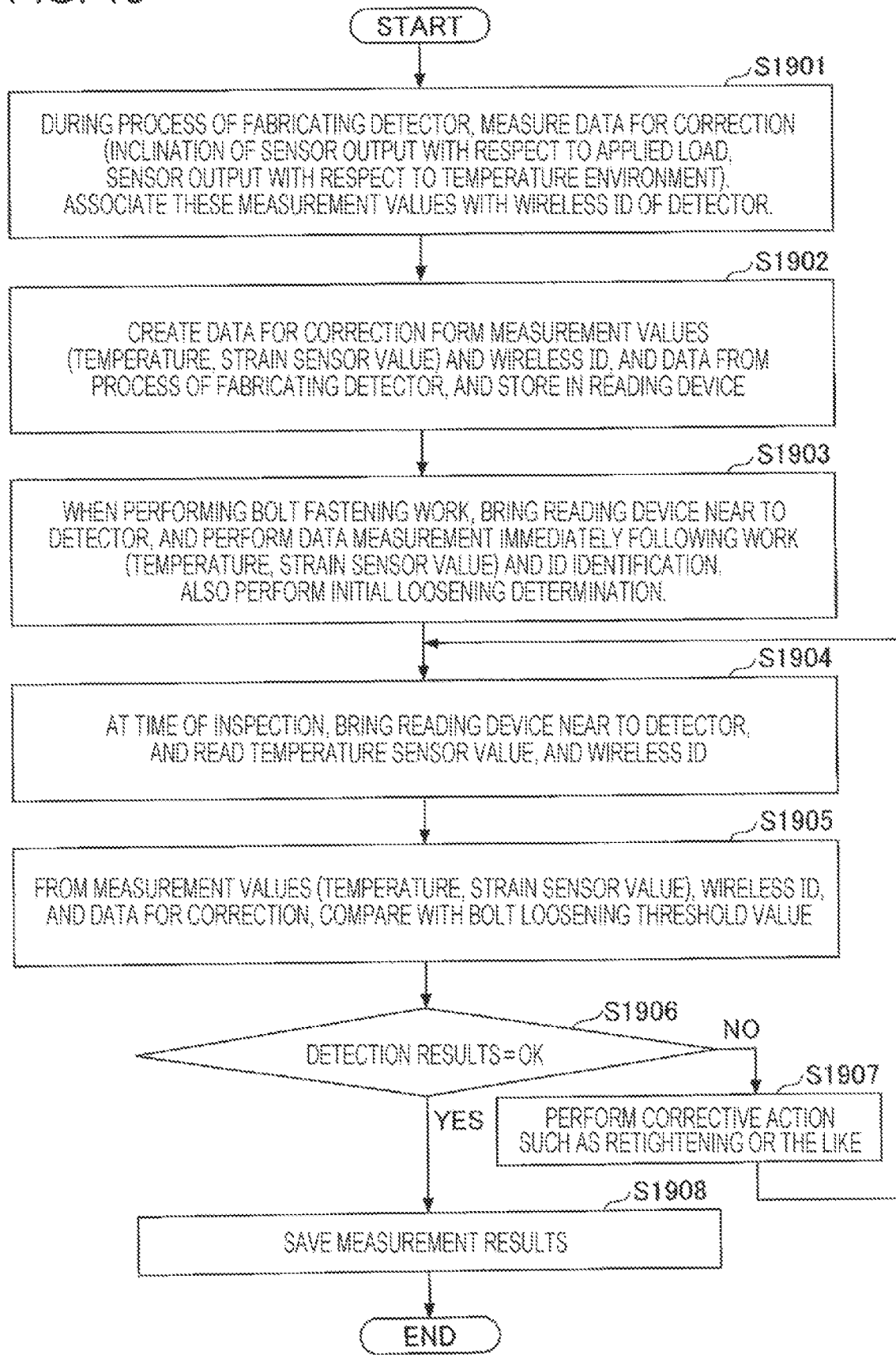
FIG. 19 is a flowchart showing work procedures for the detector according to the third embodiment.

FIG. 19 is a flowchart showing work procedures for the detector 120 according to the third embodiment.

First, data for correction (inclination of sensor output with respect to applied load, sensor output with respect to temperature environment) are measured during a process of fabricating the detector 120. These measurement values are then associated with the wireless ID of the detector 120 (step S1901).

Next, data for correction and a correction table are created from the measurement values (temperature, strain sensor value) and the wireless ID of the detector 120, and the data from the process of fabricating the detector 120, which are stored in the reading device 140 (step S1902).

Next, after bolt fastening work is performed, the reading device 140 is brought near to the detector 120, and data measurement (temperature, strain sensor value) immediately following work, and ID identification is performed. Also, initial loosening determination is performed (step S1903).

Next, the reading device 140 is brought near to the detector 120 at the time of inspection, and read temperature, sensor value, and wireless ID (step S1904).

Next, comparison thereof is made with a bolt loosening threshold value, from the measurement values (temperature and strain sensor value), wireless ID, and data for correction and correction table (step S1905). Judgement is then made regarding whether the determination results are "OK" or not (step S1906).

In a case in which judgement is made in step S1906 that the determination results are not "OK" (No in step S1906), corrective actions such as retightening or the like is performed (step S1907). The work then is returned to step S1904.

In a case in which judgement is made in step S1906 that the determination results are "OK" (Yes in step S1906), the measurement results are saved (step S1908). Thus, the series of work shown in FIG. 19 is ended.

The work procedures in FIG. 19 will be described below in further detail.

<When Manufacturing Detector 120>
  (1) After assembling sensor module, apply no load and a rated load under a certain temperature
  (2) Record sensor output at that time
  (3) Create offset correction data from sensor output under no load
  (4) Create inclination correction data from sensor output under no load and rated load
  (5) Create temperature correction data from representative temperature properties of strain gauge inside sensor
  (6) Change temperature and repeat (1) to (4)
  (7) Associate each piece of correction data with wireless ID of detector 120
  (8) Store correction data in main unit 140A of reading device 140

\<When Tightening Bolt\>
(1) After performing installation of bolt, module, and nut, place cover 140B of reading device 140 thereover
(2) Fix so that focus of radiation thermometer 144 is situated on detector 120 (guided by outer form)
(3) Measure temperature of detector 120 by radiation thermometer 144
(4) Record sensor output following installation
(5) Associate each piece of data with wireless ID of detector 120

\<When Inspecting for Looseness on Field\>
(1) Place cover 140B of reading device 140 over bolt
(2) Fix so that focus of radiation thermometer 144 is situated on detector 120 (guided by outer form)
(3) Measure temperature of detector 120 by radiation thermometer 144
(4) Read wireless ID of detector 120 and sensor information by radio waves from reading device 140
(5) Perform correction of sensor output from data of radiation thermometer 144, wireless ID of detector 120, and information at time of installation
(6) Determine whether good or faulty Necessity of Temperature Correction Description will be made here regarding the necessity of temperature correction of a resistance-change type strain sensor. Examples of resistance-change type strain sensors include metal thin-film types (CuNi, NiCr, etc.) and piezoelectric types in which silicon is doped by an impurity, and so forth. All of these perform detection of strain by the resistance value of a strain detecting element changing under minute change in length (strain) of the strain detecting element.

Resistance value change $\Delta R$ of a resistance-change type strain sensor is affected by temperature, and generally is found by the following Expression (1).

$$\Delta R = \text{resistance value change due to strain} + \text{resistance value change in gauge material due to temperature} + \text{resistance value change in gauge factor due to temperature} \quad (1)$$

In Expression (1), the resistance value change in the gauge material due to temperature and the resistance value change in the gauge factor due to temperature are properties that are nonlinear with respect to temperature, and great temperature differences can greatly affect the originally-intended resistance value change value due to strain. Accordingly, correction regarding temperature needs to be performed in order to accurately measure strain.

For example, in a case of a metal thin-film (CuNi, NiCr, etc.), in the following Expression (2), the gauge factor K is "2.1", a temperature coefficient of change (TCR) of resistance change of gauge material due to temperature is "14 ppm/° C.", and a temperature coefficient of gauge factor TCGF is "−300 ppm/° C.".

$$\Delta R = R*|\varepsilon + TCR*\Delta t|*K*(1+TCGF*\Delta t) \quad (2)$$

Note that in Expression (2), the meaning of the symbols is as follows.
$\Delta R$: amount of change in resistance value of strain sensor
$R$: resistance value of strain sensor
$\varepsilon$: strain
TCR: temperature coefficient of change, of resistance change of gauge material due to temperature
$\Delta t$: temperature change (° C.)
K: Gauge factor of strain sensor
TCGF: temperature coefficient of gauge factor of strain sensor For example, in a case of the detector 120 being fastened by a bolt when the temperature is 25° C., and strain change due to fastening being 200 micro-strain, "0.050Ω" is found for the change in resistance value $\Delta R$ from the following Expression (3), since $\Delta t=0$.

$$\Delta R1=R*\varepsilon*K=120*200E-6*2.1=0.050\Omega \quad (3)$$

On the other hand, in a case in which the temperature changes 50° C. with the detector 120 remaining fastened by the bolt, the change in resistance value $\Delta R$ changes to "0.223Ω" found by the following Expression (4).

$$\Delta R2 = R*(\varepsilon + TCR*\Delta t)*K*(1 + TCGF*\Delta t) = \quad (4)$$
$$120*(200E-6 + 14E-6*50)*2.1*(1-300E-6*50) = 0.223\Omega$$

That is to say, when the temperature at the time of installation is 25° C., and the temperature changes by 50° C. in direct sunlight under a hot sun, the difference in the resistance value $\Delta R$ is $\Delta R2-\Delta R1=0.173\Omega$.

This is several times the amount of change in resistance value due to strain when there is no temperature change, and whether the change is due to strain or due to temperature is indistinguishable. That is to say, correction regarding the effects of temperature change is necessary. Particularly, representative properties of semiconductor piezoelectric gauges is TCR of 1300 ppm/° C. K=100, and TCGF=−2000 ppm/° C., which are great, and effects of temperature are even more markedly manifested.

The detecting system 100 according to the third embodiment can sense strain of the strain element 121 with a high level of precision, by performing temperature correction regarding the first detection value and the second detection value. Specifically, the detecting system 100 removes the common components in the first detection value and the second detection value by outputting the difference value of the first detection value and the second detection value from the detector 120, thereby performing temperature correction with regard to the first detection value and the second detection value. Further, in the detecting system 100, the control unit 143 of the reading device 140 performs correction of the difference value of the first detection value and the second detection value (or of the first detection value and the second detection value) on the basis of the temperature of the detector 120 measured by the radiation thermometer 144, and the correction data created in advance, thereby performing temperature correction with regard to the first detection value and the second detection value.

Example of Correction Data

Figure 20:
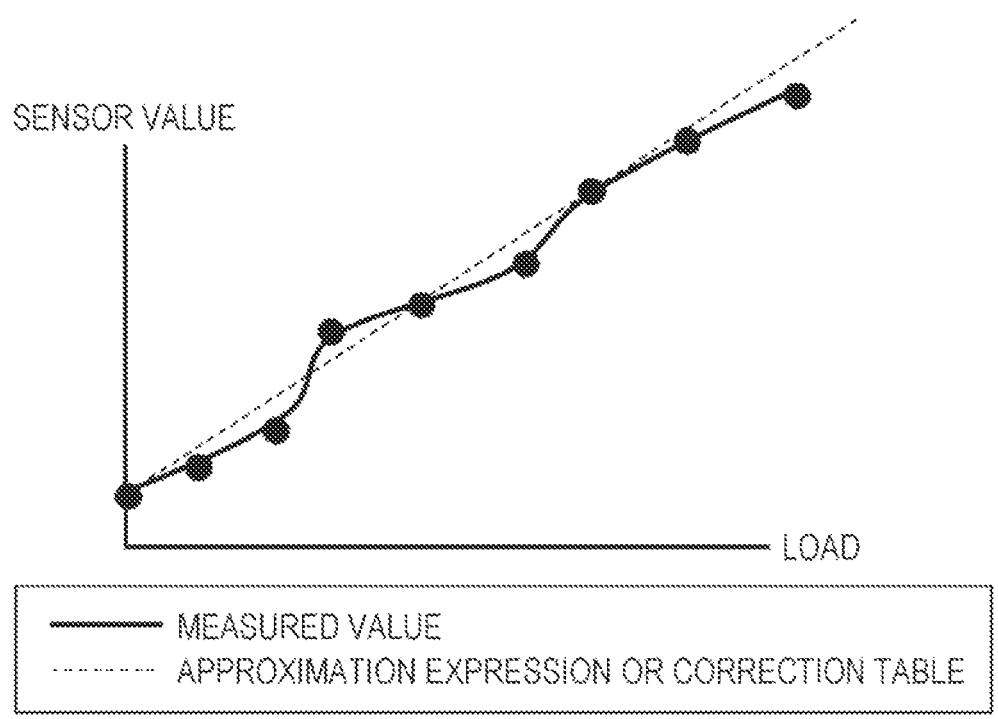
FIG. 20 is a graph showing an example of correction data for offset correction and inclination correction of sensor values used by the reading device according to the third embodiment.
Figure 21:
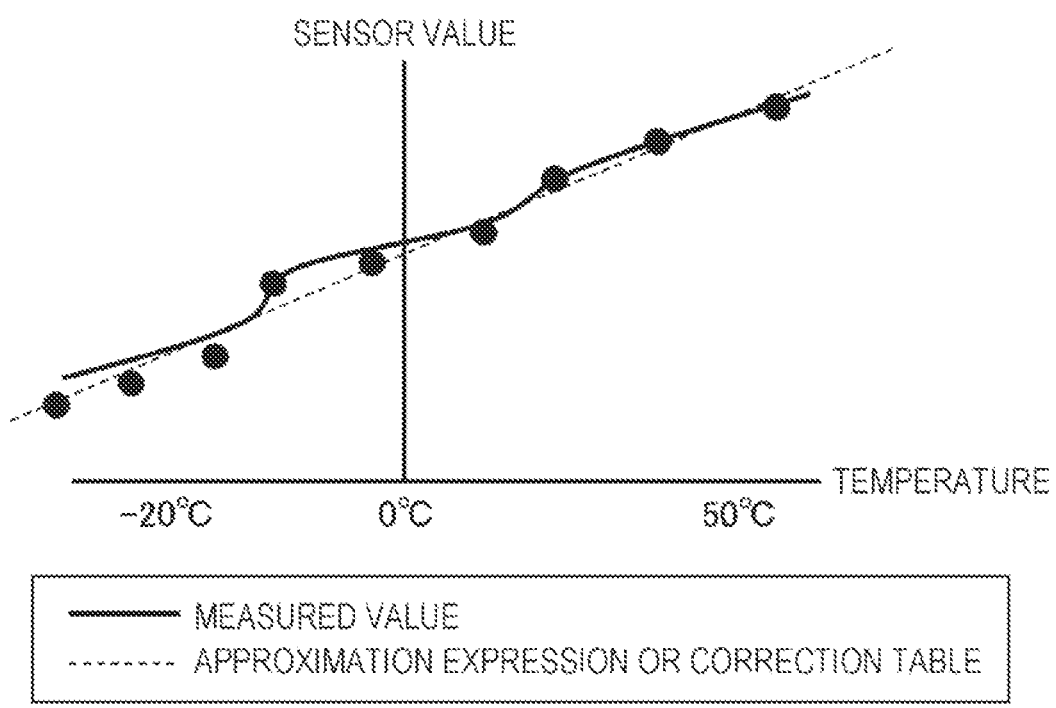
FIG. 21 is a graph showing an example of correction data for temperature correction of sensor values used by the reading device according to the third embodiment.

FIG. 20 is a graph showing an example of correction data for offset correction and inclination correction of sensor values used by the reading device 140 according to the third embodiment. FIG. 21 is a graph showing an example of correction data for temperature correction of sensor values used by the reading device 140 according to the third embodiment.

The control unit 143 of the reading device 140 according to the third embodiment can perform offset correction and inclination correction of sensor values using the correction data shown in FIG. 21. Also, the control unit 143 of the reading device 140 according to the third embodiment can perform temperature correction of sensor values using the correction data shown in FIG. 22.

For example, the correction data shown in FIG. 20 is created as correction values (approximation expression or correction table) for performing offset correction and inclination correction of sensor values, by starting from a state under a certain temperature in which no load is applied to the sensor and changing the load applied to the sensor, and measuring each of the sensor values (measured values) at each of a plurality of loads.

Also, for example, the correction data shown in FIG. 21 is created as correction values (approximation expression or correction table) for performing temperature correction of sensor values, in a state in which a certain load is applied to the sensor and changing the temperature of the ambient atmosphere of the sensor, and measuring each of the sensor values (measured values) at each of a plurality of ambient atmosphere temperatures.

Example of Input/Output Properties of Detector 120

FIG. 22 is a diagram showing an example of input/output properties of the detector 120 according to the third embodiment. In FIG. 22, input load F, strain ε, resistance value of strain sensor R, gauge factor of strain sensor K, and amount of change in resistance value of strain sensor ΔR, are shown for each of a strain element 121 that is 10 mm in diameter and a strain element 121 that is 24 mm in diameter, as an example.

Change in Resistance Value of Sensors 122 and 123 with Respect to Strain

Figure 23:
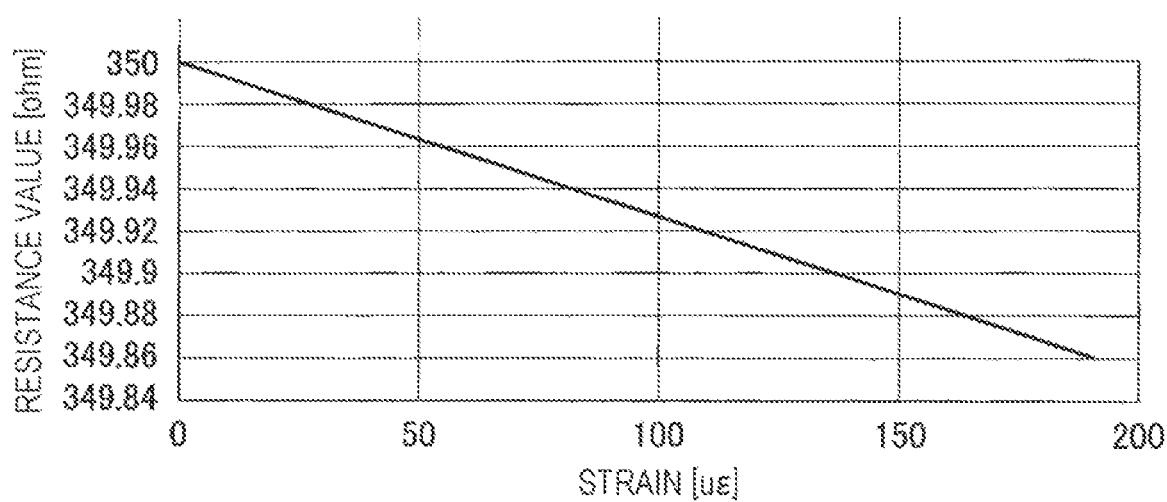
FIG. 23 is a graph showing change in resistance value of a sensor included in the detector according to the third embodiment, with respect to strain.

FIG. 23 is a graph showing change in resistance values of the sensors 122 and 123 included in the detector 120 according to the third embodiment, with respect to strain. As shown in FIG. 23, the resistance values of the sensors 122 and 123 are such that the resistance values linearly decrease as the amount of strain increases. Note however, that FIG. 23 shows resistance values in a case in which strain occurs in a direction of the sensors 122 and 123 shrinking. In a case in which strain occurs in a direction of the sensors 122 and 123 stretching, the resistance values of the sensors 122 and 123 will linearly increase as the amount of strain increases, opposite to the graph shown in FIG. 23.

Modifications of Disposing Positions of Sensors 122 and 123

FIG. 24 is a diagram illustrating a first modification of disposing positions of the sensors 122 and 123 in the strain element 121 according to the third embodiment. FIG. 25 is a diagram illustrating a second modification of disposing positions of the sensors 122 and 123 in the strain element 121 according to the third embodiment.

In the first modification illustrated in FIG. 24, the sensors 122 and 123 are provided arrayed in the up-down direction (center axis X3 direction), on the same planar portion 121C of the strain element 121.

In the second modification illustrated in FIG. 25, the sensors 122 and 123 are provided arrayed in the right-left direction (direction orthogonal to center axis X3 direction), on the same planar portion 121C of the strain element 121.

Evaluation Results of Detector 120

FIG. 26 is a diagram showing evaluation results of the detector 120 according to the third embodiment.

In FIG. 26, configuration A shows evaluation results of the detector 120 in a case in which the sensors 122 and 123 are provided arrayed in the up-down direction (center axis X3 direction), on the same planar portion 121C of the strain element 121, as illustrated in FIG. 24.

In FIG. 26, configuration B shows evaluation results of the detector 120 in a case in which the sensors 122 and 123 are provided arrayed in the right-left direction (direction orthogonal to center axis X3 direction), on the same planar portion 121C of the strain element 121, as illustrated in FIG. 25.

In FIG. 26, configuration C shows evaluation results of the detector 120 in a case in which the sensors 122 and 123 are each provided separately on two planar portions 121C of the strain element 121, as illustrated in FIG. 16.

As indicated by evaluation item "thickness" in FIG. 26, in a case of configuration B or configuration C being employed, the sensors 122 and 123 can be disposed at the same height position on the side face of the strain element 121, and accordingly reduction in thickness of the strain element 121 can be realized.

As indicated by evaluation item "temperature variance" in FIG. 26, in a case of configuration A or configuration B being employed, the sensors 122 and 123 can be disposed in close proximity on the same planar portion 121C of the strain element 121, and accordingly temperature difference between the sensors 122 and 123 can be suppressed, and temperature correction of both can be performed with a high level of precision.

As indicated by evaluation item "wiring connection" in FIG. 26, in a case of configuration A or configuration B being employed, the sensors 122 and 123 can be disposed in close proximity on the same planar portion 121C of the strain element 121, and accordingly wiring distance between the sensors 122 and 123 and the control circuit 124 can be shortened.

As indicated by evaluation item "bonding defect" in FIG. 26, in a case of configuration C being employed, one each of the sensors can be disposed on each of two planar portions 121C of the strain element 121, and accordingly large-size sensors can be disposed, and bonding defects of the sensors can be suppressed.

In the above description, the detector 120 according to the third embodiment is a detector 120 that detects fastening axial force applied in the axial direction by a fastening unit 150, and includes the strain element 121 that has the through hole 121A through which a bolt portion 151A of the fastening unit 150 is passed, the first strain sensing sensor 122 that is disposed on a planar portion 121C that is a planar side face of the strain element 121 and senses strain of the strain element 121, and the second strain sensing sensor 123 that is disposed on a planar portion 121C that is a planar side face of the strain element 121 and senses strain of the strain element 121.

Accordingly, in the detector 120 according to the third embodiment, common components (error due to effects of temperature, noise, etc.) included in the first detection value from the first strain sensing sensor 122 and the second detection value from the second strain sensing sensor 123 can be removed by using the first detection value and the second detection value. Thus, according to the detector 120 of the third embodiment, the sensing precision of strain of the strain element 121 by the strain gauge disposed on the strain element 121 can be raised.

Also, in the detector 120 according to the third embodiment, the first strain sensing sensor 122 and the second strain sensing sensor 123 have the same temperature properties as each other.

Accordingly, in the detector 120 according to the third embodiment, common components (error due to effects of temperature, noise, etc.) included in the first detection value and the second detection value are substantially the same as each other, and thus the common components can be removed with an even higher level of precision.

Also, in the detector 120 according to the third embodiment, the first strain sensing sensor 122 senses strain in the axial direction of the strain element 121, and the second strain sensing sensor 123 senses strain in the direction orthogonal to the axial direction of the strain element 121.

Accordingly, in the detector 120 according to the third embodiment, by finding the difference value between the first detection value and the second detection value, the amount of strain of the strain element 121 after the common components included in the first detection value and the second detection value are removed can be found as a strain detection value that represents the amount of strain of the strain element 121 with a high level of precision.

Also, the detector 120 according to the third embodiment further includes the control circuit 124 that wirelessly transmits the difference value of the first detection value and the second detection value to the reading device 140.

Accordingly, the detector 120 according to the third embodiment can wirelessly transmit the strain detection value that represents the amount of strain of the strain element 121 with a high level of precision, following removing the common components included in the first detection value and the second detection value, to the reading device 140.

Also, in the detector 120 according to the third embodiment, the control circuit 124 further wirelessly transmits the wireless ID of the detector 120 to the reading device 140.

Accordingly, the detecting system 100 according to the third embodiment can easily perform correlation of the strain detection value acquired from the detector 120 and the identification information of the detector 120 at the reading device 140.

Also, the detecting system 100 according to the third embodiment includes the detector 120 and the reading device 140.

Accordingly, in the detecting system 100 according to the third embodiment, the reading device 140 can acquire the strain detection value that represents the amount of strain of the strain element 121 with a high level of precision from the detector 120. Thus, according to the detecting system 100 of the third embodiment, the state of fastening by the fastening unit 150 can be comprehended at the reading device 140 with an even higher level of precision.

Also, in the detecting system 100 according to the third embodiment, the reading device 140 has the cover 140B that is placed so as to cover the detector 120 when reading data from the detector 120.

Accordingly, in the detecting system 100 according to the third embodiment, when reading data witlessly transmitted from the detector 120, data wirelessly transmitted from other detectors 120 can be kept from being erroneously detected. Also, in the detecting system 100 according to the third embodiment, the form of the cover 140B can be made a form that matches the detector 120, thereby facilitating positioning of the cover 140B as to the detector 120.

Also, in the detecting system 100 according to the third embodiment, the reading device 140 has the antenna 141A that receives the difference value and the wireless ID, at a position in the cover 140B placed so as to cover the detector 120, facing the control circuit 124.

Accordingly, in the detecting system 100 according to the third embodiment, the precision of communication between the control circuit 124 and the antenna 141A can be raised.

Also, in the detecting system 100 according to the third embodiment, the reading device 140 has the radiation thermometer 144 that measures the temperature of the detector 120, at a position in the cover 140B placed so as to cover the detector 120, facing the detector 120.

Accordingly, in the detecting system 100 according to the third embodiment, the temperature can be measured at a position closer to sensor 122 and 123.

Also, in the detecting system 100 according to the third embodiment, the reading device 140 has the control unit 143 that corrects the difference value on the basis of temperature of the detector 120 measured by the radiation thermometer 144.

Accordingly, in the detecting system 100 according to the third embodiment, the strain detection value that represents the amount of strain of the strain element 121 with a high level of precision can be calculated.

Malfunction Determination Function

The detecting system 100 according to the third embodiment has a function of determining malfunction of the sensors 122 and 123. The ratio of the shrinking strain of the strain element 121 in the center axis X3 direction and the stretching strain of the strain element 121 in the radial direction, when a load is placed on the strain element 121 in the center axis X3 direction, is decided by the Poisson's ratio of the material used for the strain element 121 (e.g., approximately 0.3 for stainless steel). This Poisson's ratio is constant as long as great deformation such as plastic deformation or the like does not occur in the strain element 121. Accordingly, in a case in which the ratio of the first detection value output from the first strain sensing sensor 122 and the second detection value output from the second strain sensing sensor 123 being deviated from a predetermined ratio (i.e., the Poisson's ratio) by a great extent (e.g., in a case of being outside of a range of 0.2 to 0.4 as to a normal value of 0.3), the detecting system 100 can determine that "at least one of the first strain sensing sensor 122 and the second strain sensing sensor 123 is malfunctioning (e.g., deformation, line breakage, detachment of adhesive agent, etc.)" by the malfunction determination function. Note that the malfunction determination function may be provided to the control circuit 124 of the detector 120, or may be provided to the control unit of the reading device 140.

Although embodiments of the present invention have been described above in detail, the present invention is not limited to these embodiments, and various modifications or alterations may be made within the essence of the present invention set forth in the Claims.

For example, while a nut is used as the fastening member in the above usage example, this is not restrictive, and a bolt may be used as the fastening member.

Also, while four strain detecting elements 21A to 21D are provided to the planar portion 16A in the above first embodiment, for example, this is not restrictive, and three or less, or five or more strain detecting elements may be provided to the planar portion 16A, for example. For example, an arrangement may be made in which the strain detecting elements 21A and 21B are provided to the planar portion 16A but the strain detecting elements 21C and 21D are not provided. Also, an arrangement may be made in which, for example, the strain detecting elements 21C and 21D are provided to the planar portion 16A but the strain detecting elements 21A and 21B are not provided. Also, a configuration may be made in which strain detecting elements are provided to both of the planar portions 16A and 16B.

Also, while a configuration is made in the above first embodiment in which the pair of planar portions 16A and 16B are suitably provided, for example, this is not restrictive, and a configuration may be made in which only the one planar portion on which the strain detecting elements are provided is provided, for example. Also, while a configuration is made in which the planar portion 16A is formed at a position closer to the center axis X1 than the planar portion 16B, for example, this is not restrictive, and a configuration may be made in which, for example, the planar portion 16A and the planar portion 16B are placed at equal distances from the center axis X1.

Also, while an arrangement is made in the above second embodiment in which, for example, two strain detecting elements 61A and 61B are provided on the upper face 52B1 of the protruding portion 52B, for example, this is not restrictive, and three or more strain detecting elements may be provided on the upper face 52B1, for example.

Also, while the strain element 12 is generally cylindrical in form in the above first embodiment, this is not restrictive. For example, the strain element 12 may have a prismatic form or the like that has planar portions on side faces.

Also, while the base portion 52A of the strain element 52 is generally cylindrical in form in the above second embodiment, for example, this is not restrictive. For example, the base portion 52A may be a generally prismatic form that has the protruding portion on the outer side thereof, or the like.

Also, while a configuration is made in the above second embodiment in which the protruding portion 52B is suitably formed in a flange form in the horizontal direction from the outer circumference of the end portion of the bottom face side of the base portion 52A, for example, this is not restrictive, and it is sufficient for the protruding portion 52B to be provided protruding in the horizontal direction from the outer side (outer circumferential face) of the base portion 52A.

Also, while the two methods of a method of outputting the difference value of the first detection value and the second detection value to the reading device 140, and a method of performing temperature correction at the reading device 140 on the basis of the measurement value of the radiation thermometer 144, are described in the above third embodiment as methods for temperature compensation for sensor detection values, for example, these technologies may be used to perform temperature compensation of sensor detection values as in the following Modifications 1 to 3.

Modification 1

For example, the difference value of the first detection value and the second detection value may be output from the detector 120 to the reading device 140, and temperature correction of the difference value of the first detection value and the second detection value may be performed at the reading device 140 on the basis of the measurement value of the radiation thermometer 144 (i.e., temperature of the detector 120).

Modification 2

Also, for example, the first detection value and the second detection value may both be output from the detector 120 to the reading device 140, and temperature correction of both the first detection value and the second detection value may be performed at the reading device 140 on the basis of the measurement value of the radiation thermometer 144.

Modification 3

Also, for example, one sensor of the first strain sensing sensor 122 and the second strain sensing sensor 123 may be provided to the detector 120, the detection value of the one sensor may be output to the reading device 140, and temperature correction of the detection value of the one sensor may be performed at the reading device 140 on the basis of the measurement value of the radiation thermometer 144.

Fourth Embodiment

Figure 27:
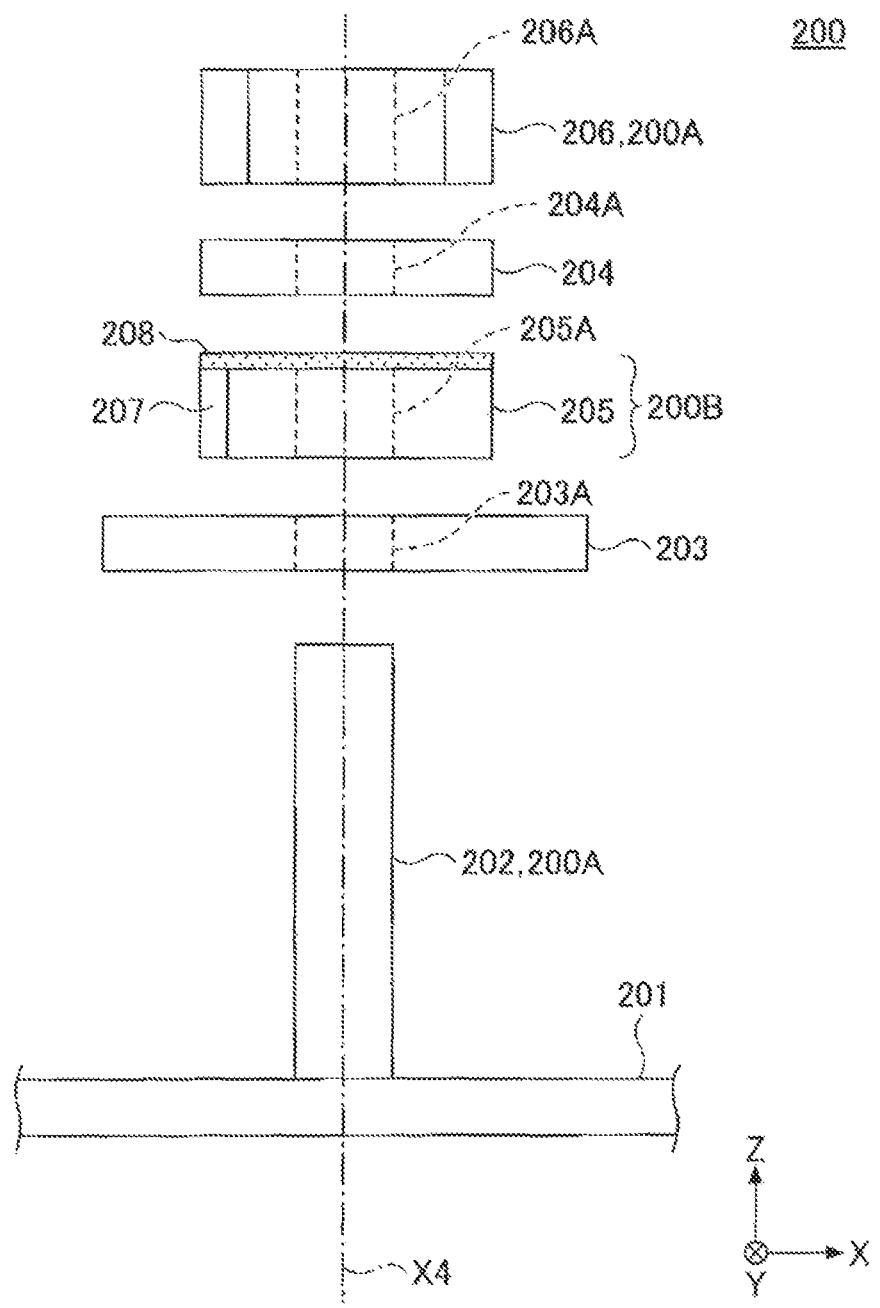
FIG. 27 is an exploded view of a fastening structure according to a fourth embodiment.
Figure 28:
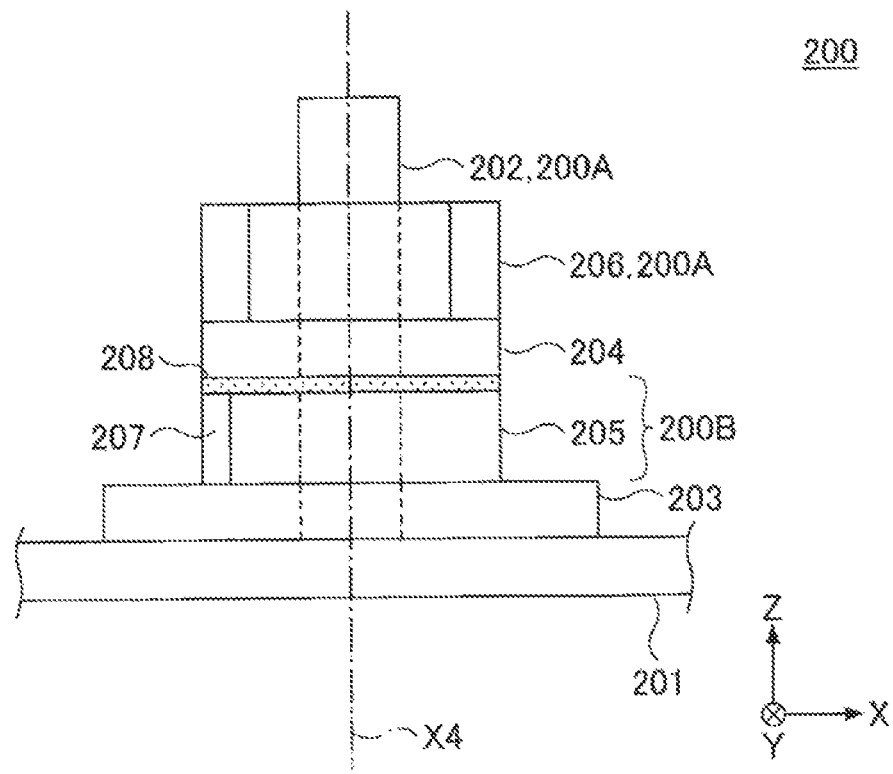
FIG. 28 is a diagram illustrating a fastened state of the fastening structure according to the fourth embodiment.

FIG. 27 is an exploded view of a fastening structure 200 according to a fourth embodiment. FIG. 28 is a diagram illustrating a fastened state of the fastening structure 200 according to the fourth embodiment.

As illustrated in FIGS. 27 and 28, the fastening structure 200 according to the fourth embodiment is an arrangement in which a fastened member 203 is fixed to an attachment face 201 by screwing, using a fastening unit 200A made up of a nut 206 and a bolt shaft 202.

As illustrated in FIGS. 27 and 28, the fastening structure 200 includes, in order from the attachment face 201 side (Z-axial negative side), the attachment face 201, the bolt shaft 202, the fastened member 203, a strain element 205, a washer 204, and the nut 206.

The attachment face 201 is a flat face to which the fastened member 203 is attached. The fastened member 203 is a member that is made of metal and is plate-like, and that is attached to the attachment face 201. A through hole 203A that passes through the fastened member 203 in the up-down direction is formed in the fastened member 203. The bolt shaft 202 can be inserted through the through hole 203A.

The bolt shaft 202 is a member that is made of metal and is rod-like, and that is perpendicularly erected with respect to the attachment face 201 and extends following a center axis X4. A screw thread (omitted from illustration) to which the nut 206 can be screwed is formed on an outer circumferential face of the bolt shaft 202. The lower end portion of the bolt shaft 202 is fixed to the attachment face 201. The bolt shaft 202 may pass through the attachment face 201.

The strain element 205 is a block-like member that has a generally thin cylindrical form. A metal material such as stainless steel or the like, for example, is suitably used to form the strain element 205. An arrangement that is the same as the strain element 12 described in the first embodiment, an arrangement that is the same as the strain element 52 described in the second embodiment, or a modification of these, may be used for the strain element 205. A through hole 205A that passes through the strain element 205 in the up-down direction is formed in the center of the strain element 205. The bolt shaft 202 can be inserted through the through hole 205A. The strain element 205 makes up a detector 200B along with a strain sensing module 207 that is integrated with the strain element 205. An arrangement that is the same as the strain sensing module 20 described in the first embodiment, an arrangement that is the same as the strain sensing module 60 described in the second embodiment, or a modification of these, may be used for the strain sensing module 207. Note that an upper face of the strain element 205 is a face that comes into contact with a lower face of the washer 204, and the upper face of the strain element 205 is coated with a lubricant 208 (grease, oil, etc.).

The washer 204 is a member that is made of metal and that is disc-like. The washer 204 is provided between the strain element 205 and the nut 206. A through hole 204A that passes through the washer 204 in the up-down direction is formed in the center of the washer 204. The bolt shaft 202 can be inserted through the through hole 204A. The diameter of the washer 204 is preferably larger than both of the diameter of the nut 206 and the diameter of the strain element 205.

The nut 206 is a member that is made of metal and can be screwed to the bolt shaft 202. An outer circumferential face of the nut 206 is formed with a hexagonal form. A screw hole 206A that passes through the nut 206 in the up-down direction is formed in the center of the nut 206. A screw thread (omitted from illustration) that can be screwed to the bolt shaft 202 is formed on an inner circumferential face of the screw hole 206A.

In the fastening structure 200 configured in this way, the fastened member 203, the strain element 205, and the washer 204 are placed between the attachment face 201 and the nut 206 in that order from the attachment face 201 side as illustrated in FIG. 28, and the nut 206 is screwed down and tightened with respect to the bolt shaft 202 in the state in which the bolt shaft 202 is passed through the fastened member 203, the strain element 205, and the washer 204, by which the fastened member 203, the strain element 205, and the washer 204 are fixed to the attachment face 201. At this time, due to fastening axial force in the axial direction (Z-axial direction) of the bolt shaft 202 being applied, stress occurs in the strain element 205 in accordance with the tightening torque of the nut 206. The strain occurring in the strain element 205 is detected by the strain sensing module 207. The strain sensing module 207 outputs a strain detection signal representing a voltage value corresponding to the detected strain to an external device via wireless communication. For example, the external device can judge the tightening state of the nut 206 on the basis of the voltage value that the strain detection signal acquired from the strain sensing module 207 indicates.

Now, by providing the washer 204 between the strain element 205 and the nut 206, the fastening structure 200 according to the fourth embodiment can reflect the tightening torque of the nut 206 in the strain occurring at the strain element 205 more accurately, as compared to a configuration in which the washer 204 is not provided. Accordingly, the tightening torque of the nut 206 can be judged on the basis of the stress detection signal with an even higher level of precision in the fastening structure 200 according to the fourth embodiment.

Comparative Example

Now, a comparative example of the fastening structure 200 according to the fourth embodiment will be described with reference to FIGS. 29 to 32. In the present comparative example, the present inventors alternately performed work of tightening the nut 206 and work of loosening the nut 206, for each of a case in which the washer 204 is provided to the fastening structure 200, and a case of not providing the washer 204 thereto, and change in the amount of strain occurring in the strain element 205 was measured.

Note that the conditions of carrying out the present comparative example are as follows.
- Size of bolt shaft 202: M24
- Material of bolt shaft 202: SAE 304
- Material of nut 206: SAE 304
- Material of washer 204: SAE 304
- Thickness of washer 204: 4 mm
- Tightening torque of nut 206: 400 Nm (first time), 200 Nm (second time)

Figure 29:
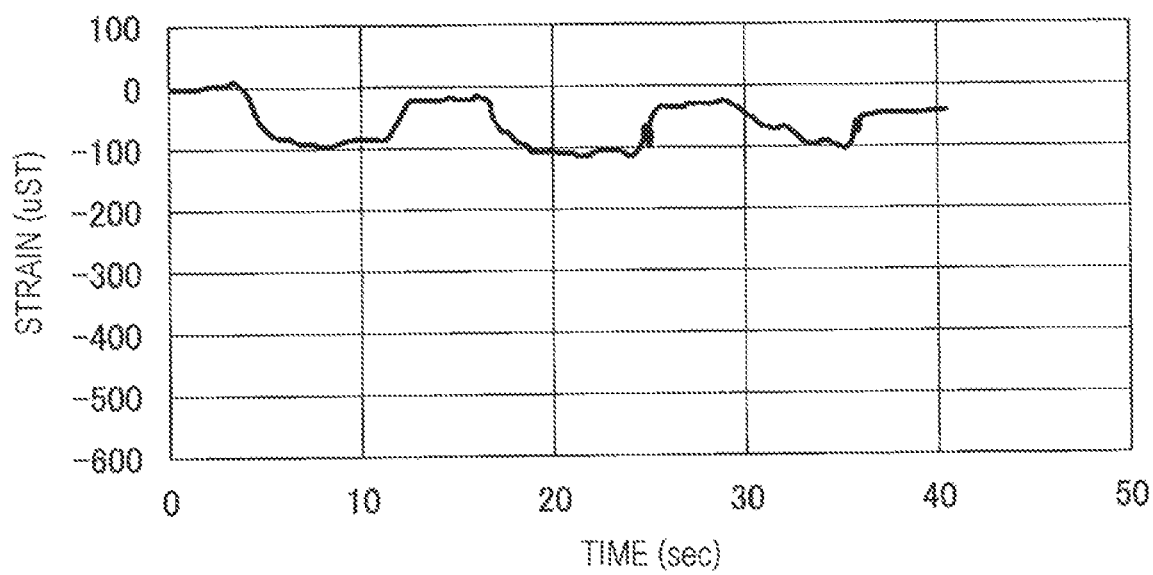
FIG. 29 is a graph showing measurement results of amount of strain of a strain element in the fastening structure according to the fourth embodiment (case with no washer provided)
Figure 30:
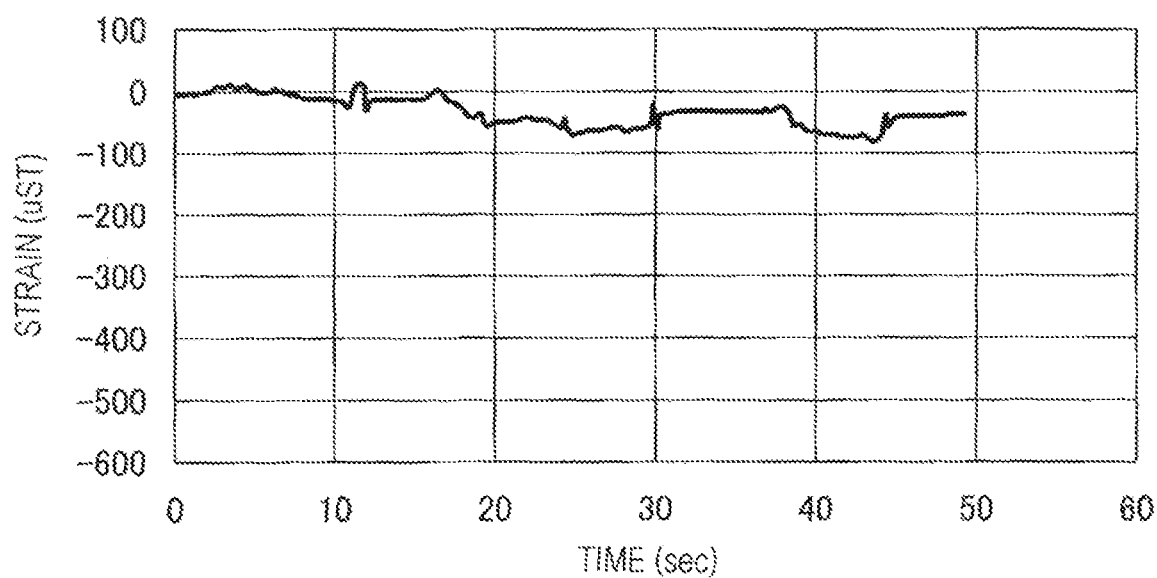
FIG. 30 is a graph showing measurement results of amount of strain of the strain element in the fastening structure according to the fourth embodiment (case with no washer provided)

FIGS. 29 and 30 are graphs showing measurement results of the amount of strain of the strain element 205 in the fastening structure 200 according to the fourth embodiment (case with no washer 204 provided). FIG. 29 shows measurement results of the first time. FIG. 30 shows measurement results of the second time.

As shown in FIGS. 29 and 30, in a case of not providing the washer 204 to the fastening structure 200, the amount of strain of the strain element 205 when the nut 206 is tightened is relatively small. The reason is that in a case in which the washer 204 is not provided to the fastening structure 200, galling occurs between the lower face of the nut 206 and the upper face of the strain element 205 due to the lower face of the nut 206 coming into direct contact with the upper face of the strain element 205, and the fastening axial force applied to the strain element 205 is reduced.

Figure 31:
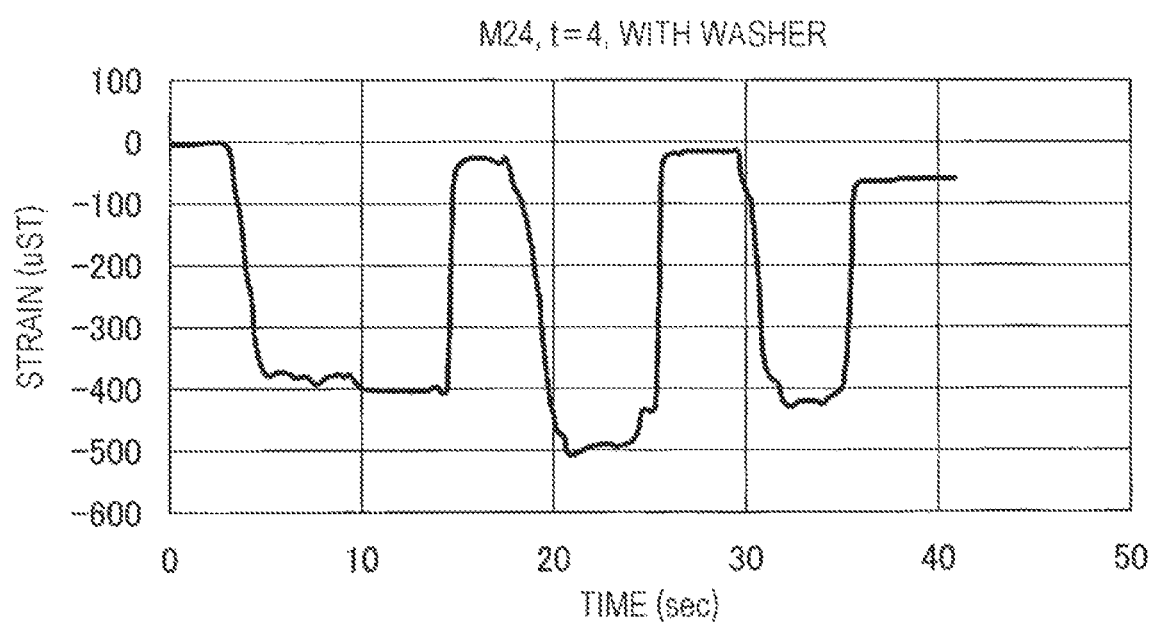
FIG. 31 is a graph showing measurement results of amount of strain of the strain element in the fastening structure according to the fourth embodiment (case with washer provided)
Figure 32:
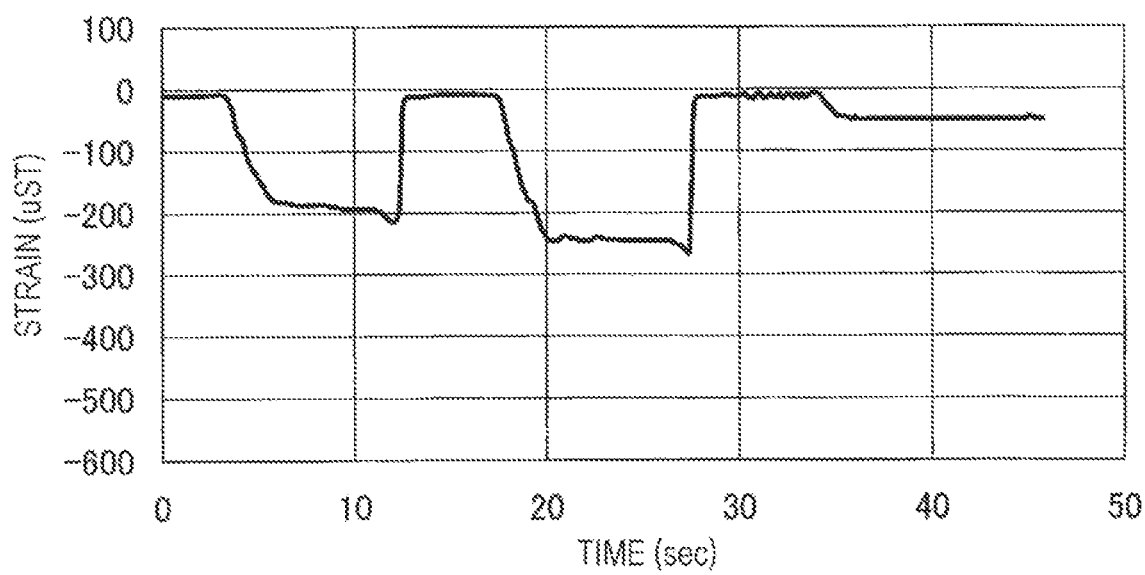
FIG. 32 is a graph showing measurement results of amount of strain of the strain element in the fastening structure according to the fourth embodiment (case with washer provided).

FIGS. 31 and 32 are graphs showing measurement results of the amount of strain of the strain element 205 in the fastening structure 200 according to the fourth embodiment (case with washer 204 provided). FIG. 31 shows measurement results of the first time. FIG. 32 shows measurement results of the second time.

As shown in FIGS. 31 and 32, in a case of providing the washer 204 to the fastening structure 200, the amount of strain of the strain element 205 when the nut 206 is tightened is relatively great. The reason is that in a case in which the washer 204 is provided to the fastening structure 200, galling does not readily occur between the lower face of the nut 206 and the upper face of the strain element 205 due to the washer 204 being interposed between the lower face of the nut 206 and the upper face of the strain element 205, and the fastening axial force applied to the strain element 205 is not readily reduced.

Note that galling between the lower face of the nut 206 and the upper face of the strain element 205 occurs even less readily by the fastening structure 200 according to the fourth embodiment having the following configurations.
- The lubricant 208 is applied on the upper face of the strain element 205.
- The hardness of the washer 204 is greater than the hardness of the nut 206.
- The upper face and the lower face of the washer 204 are smooth faces.
- Note however, that the fastening structure 200 according to the fourth embodiment may have the following configuration, and in this case as well, galling between the lower face of the nut 206 and the upper face of the strain element 205 occurs even less readily.
- The lubricant 208 is applied on the lower face of the nut 206.
- The lubricant 208 is applied on the upper face of the washer 204.
- The lubricant 208 is applied on the lower face of the washer 204.

Note that in the fastening structure 200 according to the fourth embodiment, a configuration may be made in which the head of a bolt is tightened, instead of the configuration of tightening the nut 206, and in this case, the washer 204 may be provided between the head of the bolt and the strain element 205.

What is claimed is:

1. A detector that detects fastening axial force applied by a fastening unit in an axial direction, the detector comprising:
   a strain element that has a through hole through which a bolt portion that the fastening unit has is inserted, the strain element having a planar portion at a side thereof, the planar portion extending along the axial direction and a first direction perpendicular to the axial direction, the planar portion having a center line extending along the first direction;
   a strain sensing sensor that senses strain of the strain element, the strain sensing sensor being disposed on the planar portion of the strain element; and
   an antenna disposed on the planar portion of the strain element to overlap and align with the strain sensing sensor along a second direction perpendicular to each of the axial direction and the first direction,
   wherein the strain sensing sensor is configured with first, second, third, and fourth strain detecting elements, the first and second strain detecting elements are aligned along a first linear line parallel to the first direction, and each of the first and second strain detecting elements is located closer to a bottom of the strain element than each of the third and fourth strain detecting elements and the center line of the planar portion, the third and fourth strain detecting elements are aligned along a second linear line parallel to the axial direction, and the third and fourth strain detecting elements are arranged so as to sandwich the center line of the planar portion along the second linear line.

2. The detector according to claim 1, wherein the strain element has a planar receiving portion at an upper face thereof and surrounds the through hole, and the planar receiving portion receives a fastening member that the fastening unit has.

3. The detector according to claim 1, further comprising: a control circuit.

4. The detector according to claim 3, wherein the control circuit is provided on the planar portion.

5. The detector according to claim 1, further comprising: a sealing resin that seals the planar portion.

6. The detector according to claim 1, the further comprising:

a protruding portion provided on an end portion toward a side of a bottom face of the strain element, the protruding portion being formed in a flange-like form outwardly extending from an outer circumference of the end portion along a radial direction with respect to the axial direction.

7. The detector according to claim 6, further comprising: a sealing resin that seals the protruding portion.

* * * * *